(12) United States Patent
Cheon et al.

(10) Patent No.: US 12,596,403 B2
(45) Date of Patent: Apr. 7, 2026

(54) SLIDABLE ELECTRONIC DEVICE AND CONTROL METHOD THEREOF

(71) Applicant: SAMSUNG ELECTRONICS CO., LTD., Suwon-si (KR)

(72) Inventors: Kawon Cheon, Suwon-si (KR); Yeojun Yoon, Suwon-si (KR); Soojung Lee, Suwon-si (KR); Yejin Kim, Suwon-si (KR); Youngseok Park, Suwon-si (KR); Joayoung Lee, Suwon-si (KR); Duyeong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 18/101,339

(22) Filed: Jan. 25, 2023

(65) Prior Publication Data

US 2023/0188637 A1     Jun. 15, 2023

Related U.S. Application Data

(63) Continuation of application No. PCT/KR2021/008267, filed on Jun. 30, 2021.

(30) Foreign Application Priority Data

Jul. 29, 2020     (KR) ........................ 10-2020-0094681

(51) Int. Cl.
G06F 1/16          (2006.01)
G06F 3/0484      (2022.01)
(Continued)

(52) U.S. Cl.
CPC .......... G06F 1/1652 (2013.01); G06F 1/1624 (2013.01); G06F 3/0484 (2013.01); (Continued)

(58) Field of Classification Search
CPC .... G06F 1/1624; G06F 1/1652; G06F 3/0484; G06F 3/04888; H04M 1/0235; H04M 1/0245; H04M 1/0268
See application file for complete search history.

(56) References Cited

U.S. PATENT DOCUMENTS 9,041,648 B2 * 5/2015 Lee ....................... G06F 1/1647
                                                      345/156
10,474,194 B1 * 11/2019 Ell ........................ G06F 1/1633
(Continued)

FOREIGN PATENT DOCUMENTS

KR     10-2010-0073743          7/2010
KR     10-2010-0127525        12/2010
(Continued)

OTHER PUBLICATIONS

International Search Report for PCT/KR2021/008267 mailed Sep. 17, 2021, 4 pages.
(Continued)

*Primary Examiner* — Patrick F Marinelli
(74) *Attorney, Agent, or Firm* — Nixon & Vanderhye P.C.

(57) ABSTRACT

An electronic may include: a housing; a flexible display at least a part of which is viewable to the outside through the housing; and at least one processor operatively connected to the flexible display, wherein the at least one processor may be configured to: in a state where a first portion of the flexible display is viewable to the outside, when a first user input for a sliding operation for exposing a second portion including at least a part of the first portion of the flexible display to the outside is received through the flexible display, display, on the at least a part of the first portion, an object for receiving a user input for performing at least one function; receive a second user input through a region in which the object is displayed; when the second user input is received, slide at least one region of the flexible display to (Continued)

expose the second portion of the flexible display to the outside; and display, on at least a part of the second portion, at least one screen obtained by performing at least one function corresponding to the second user input.

20 Claims, 26 Drawing Sheets

(51) Int. Cl.
*G06F 3/0488* (2022.01)
*H04M 1/02* (2006.01)

(52) U.S. Cl.
CPC ........ *G06F 3/0488* (2013.01); *H04M 1/0235* (2013.01); *H04M 1/0245* (2013.01); *H04M 1/0268* (2013.01)

(56) References Cited

U.S. PATENT DOCUMENTS

| | | | | |
|---|---|---|---|---|
| 11,029,732 | B2 * | 6/2021 | Ahn | G06V 40/1306 |
| 11,126,817 | B2 * | 9/2021 | Kim | G06V 40/1347 |
| 11,366,584 | B2 * | 6/2022 | Chung | G06F 3/04883 |
| 12,026,017 | B2 * | 7/2024 | Kim | G06F 1/1677 |
| 12,032,815 | B2 * | 7/2024 | Cheon | G06F 1/1624 |
| 12,131,088 | B2 * | 10/2024 | Jeon | G06F 1/16 |
| 12,192,399 | B2 * | 1/2025 | Kim | H04M 1/0237 |
| 12,287,674 | B2 * | 4/2025 | Yoo | G06F 1/1652 |
| 12,405,721 | B2 * | 9/2025 | Kang | G06F 3/0487 |
| 12,443,233 | B2 * | 10/2025 | Kim | H04M 1/72469 |
| 12,456,403 | B2 * | 10/2025 | Park | G06F 1/169 |
| 2010/0162182 | A1 | 6/2010 | Oh et al. | |
| 2010/0306718 | A1 | 12/2010 | Shim et al. | |
| 2014/0211399 | A1 | 7/2014 | O'Brien | |
| 2014/0340299 | A1 * | 11/2014 | Lee | G06F 3/147 |
| | | | | 345/156 |
| 2016/0092376 | A1 * | 3/2016 | Kim | G06F 21/6218 |
| | | | | 711/163 |
| 2016/0328623 | A1 * | 11/2016 | Kim | G06V 40/161 |
| 2016/0371504 | A1 | 12/2016 | Huang et al. | |
| 2016/0378270 | A1 | 12/2016 | Lee et al. | |
| 2017/0011714 | A1 | 1/2017 | Eim et al. | |
| 2018/0217679 | A1 | 8/2018 | Kwon et al. | |
| 2018/0275770 | A1 | 9/2018 | Kang et al. | |
| 2019/0227703 | A1 | 7/2019 | Lee et al. | |
| 2020/0027425 | A1 | 1/2020 | Lee et al. | |
| 2020/0081570 | A1 * | 3/2020 | Suk | G06F 3/04886 |
| 2020/0167540 | A1 * | 5/2020 | Kim | G06V 40/1347 |
| 2020/0209923 | A1 * | 7/2020 | Ahn | G06F 1/1652 |
| 2020/0225848 | A1 * | 7/2020 | Yoon | G06F 3/041 |
| 2020/0401190 | A1 | 12/2020 | Sim et al. | |
| 2021/0034210 | A1 * | 2/2021 | Chung | G06F 3/0488 |
| 2021/0089081 | A1 | 3/2021 | Ro et al. | |
| 2022/0329687 | A1 * | 10/2022 | Kim | H04M 1/0268 |
| 2023/0016622 | A1 * | 1/2023 | Gudivada | G06F 1/1624 |
| 2023/0176720 | A1 * | 6/2023 | Cheon | G06F 1/1677 |
| | | | | 345/173 |
| 2023/0188637 | A1 * | 6/2023 | Cheon | H04M 1/72448 |
| | | | | 455/575.4 |
| 2023/0259217 | A1 * | 8/2023 | Lee | G06F 3/017 |
| 2023/0393625 | A1 * | 12/2023 | Kim | G06F 3/165 |
| 2024/0319858 | A1 * | 9/2024 | Cheon | G06F 3/04847 |
| 2024/0329689 | A1 * | 10/2024 | Kim | G06F 1/1694 |
| 2024/0422252 | A1 * | 12/2024 | Kim | G06F 3/04883 |
| 2025/0004625 | A1 * | 1/2025 | Lee | H04M 1/72454 |
| 2025/0021288 | A1 * | 1/2025 | Jeon | G06F 3/14 |

FOREIGN PATENT DOCUMENTS

| | | |
|---|---|---|
| KR | 10-2017-0000553 | 1/2017 |
| KR | 10-2017-0005557 A | 1/2017 |
| KR | 10-2017-0011675 | 2/2017 |
| KR | 10-2017-0019248 | 2/2017 |
| KR | 10-2017-0038308 | 4/2017 |
| KR | 10-2017-0059815 | 5/2017 |
| KR | 10-2018-0020737 | 2/2018 |
| KR | 10-2018-0040218 | 4/2018 |
| KR | 10-2018-0041650 A | 4/2018 |
| KR | 10-2019-0089374 | 7/2019 |
| KR | 10-2019-0090982 A | 8/2019 |
| KR | 10-2019-0098340 | 8/2019 |
| KR | 10-2020-0008804 | 1/2020 |
| KR | 10-2020-0084480 A | 7/2020 |

OTHER PUBLICATIONS

Written Opinion of ISA PCT/KR2021/008267 mailed Sep. 17, 2021, 3 pages.
Korean Examination Report dated Jan. 13, 2025 for KR Application No. 10-2020-0094681.

* cited by examiner (a)

(b)

1010

1020          1021

1030

1040          1041

SLIDABLE ELECTRONIC DEVICE AND CONTROL METHOD THEREOF

CROSS REFERENCE TO RELATED APPLICATIONS

This application is a continuation of International Application No. PCT/KR2021/008267 filed on 30 Jun. 2021, designating the United States, in the Korean Intellectual Property Receiving Office, and claiming priority to Korean patent application number KR 10-2020-0094681, filed Jul. 29, 2020, the disclosures of which are all hereby incorporated by reference herein in their entireties.

BACKGROUND

Field

Certain example embodiments relate to a slidable electronic device and/or a control method thereof.

Description of Related Art

Various services and additional values provided through an electronic device, for example, a mobile electronic device such as a smartphone have been increased. Communication service providers or electronic device manufacturers competitively develop electronic devices for providing various functions and for differentiation from other businesses to improve effective values of such electronic device and satisfy various desires of users. Therefore, various functions provided through electronic devices have been increasingly advanced.

SUMMARY

An electronic device may display various contents, for example, application icons and/or widgets on a screen through a display.

In an electronic device including a flexible display, a size of a display area may be changed as a structure forming the electronic device moves and a screen is changed to an open or closed state.

In an electronic device including an existing flexible display, according to change of a size of a display area, various user inputs are needed to perform an electronic device function desired by a user. Accordingly, a user is increasingly fatigued in operating the device.

Certain example embodiments provide a slidable electronic device and/or a control method thereof for changing a display area of a flexible display and rapidly providing a function to be executed by a user while reducing the number of user inputs.

The technical problem(s) solved are not limited to the above technical problem(s) and those skilled in the art will more clearly understand other technical problems from the following description.

According to various example embodiments, an electronic device may include a housing, a flexible display at least a part of which is viewable to the outside through the housing, and at least one processor (comprising processing circuitry) operatively connected to the flexible display, wherein the at least one processor is configured to, in a state where a first portion of the flexible display is viewable to the outside, when a first user input for a sliding operation for exposing a second portion including at least a part of the first portion of the flexible display to the outside is received through the flexible display, display, on the at least a part of the first portion, an object for receiving a user input for performing at least one function, receive a second user input through a region in which the object is displayed, when the second user input is received, slide at least one region of the flexible display to expose the second portion of the flexible display to the outside, and display, on at least a part of the second portion, at least one screen on which at least one function corresponding to the second user input is performed.

According to various example embodiments, a control method of an electronic device may include in a state where a first portion of a flexible display is exposed/viewable to the outside, when a first user input for a sliding operation for exposing a second portion including at least a part of the first portion of the flexible display to the outside is received through the flexible display, an operation of displaying, on the at least a part of the first portion, an object for receiving a user input for performing at least one function, an operation of receiving a second user input through a region in which the object is displayed, when the second user input is received, an operation of sliding at least one region of the flexible display to expose the second portion of the flexible display to the outside, and an operation of displaying, on at least a part of the second portion, at least one screen on which at least one function corresponding to the second user input is performed.

According to various example embodiments, an electronic device may execute a function desired to be executed by a user through a proper input method in a sliding operation of the electronic device to reduce unnecessary user inputs. As such, the electronic device may provide enhanced user experience to a user.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
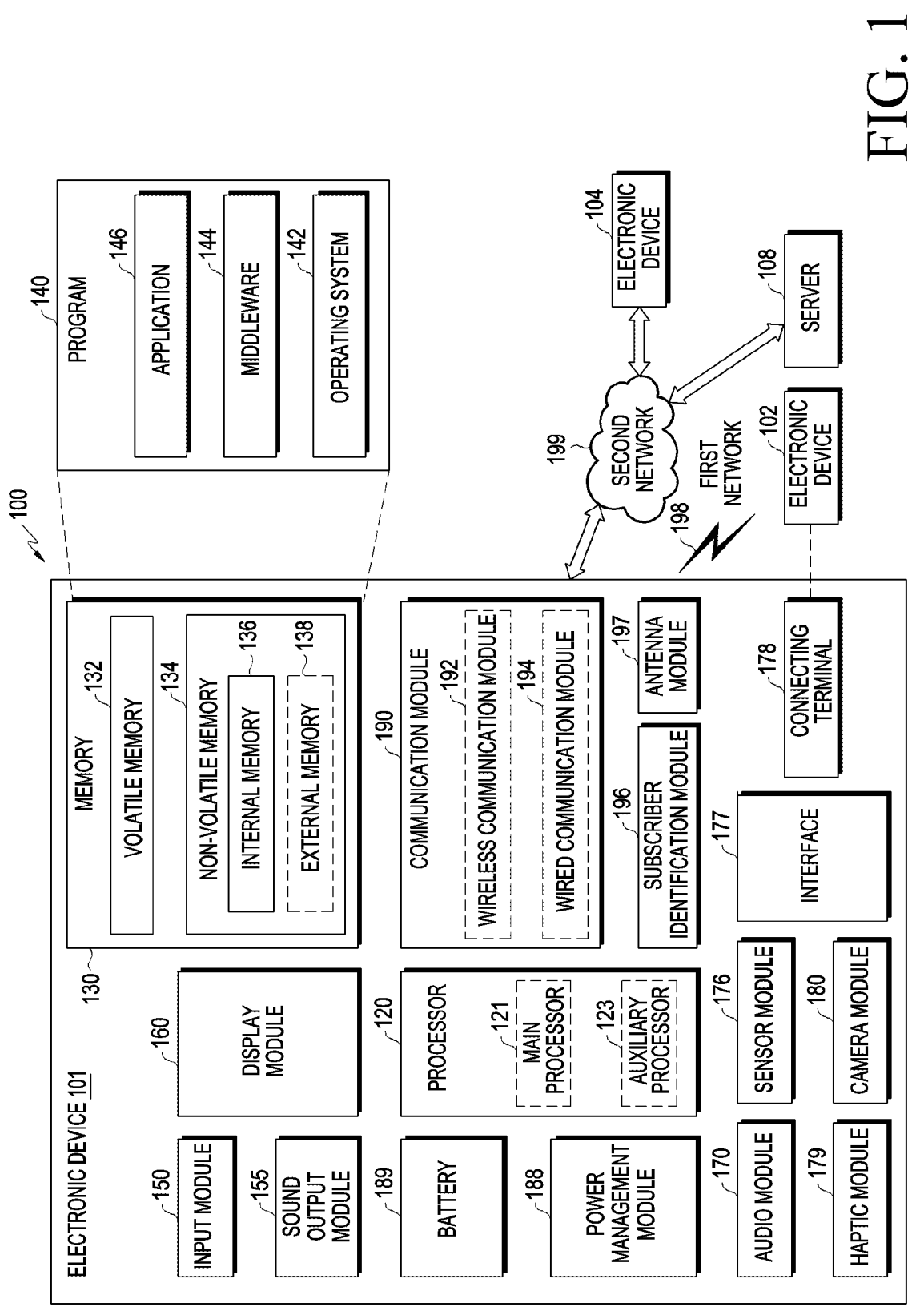
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module

176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
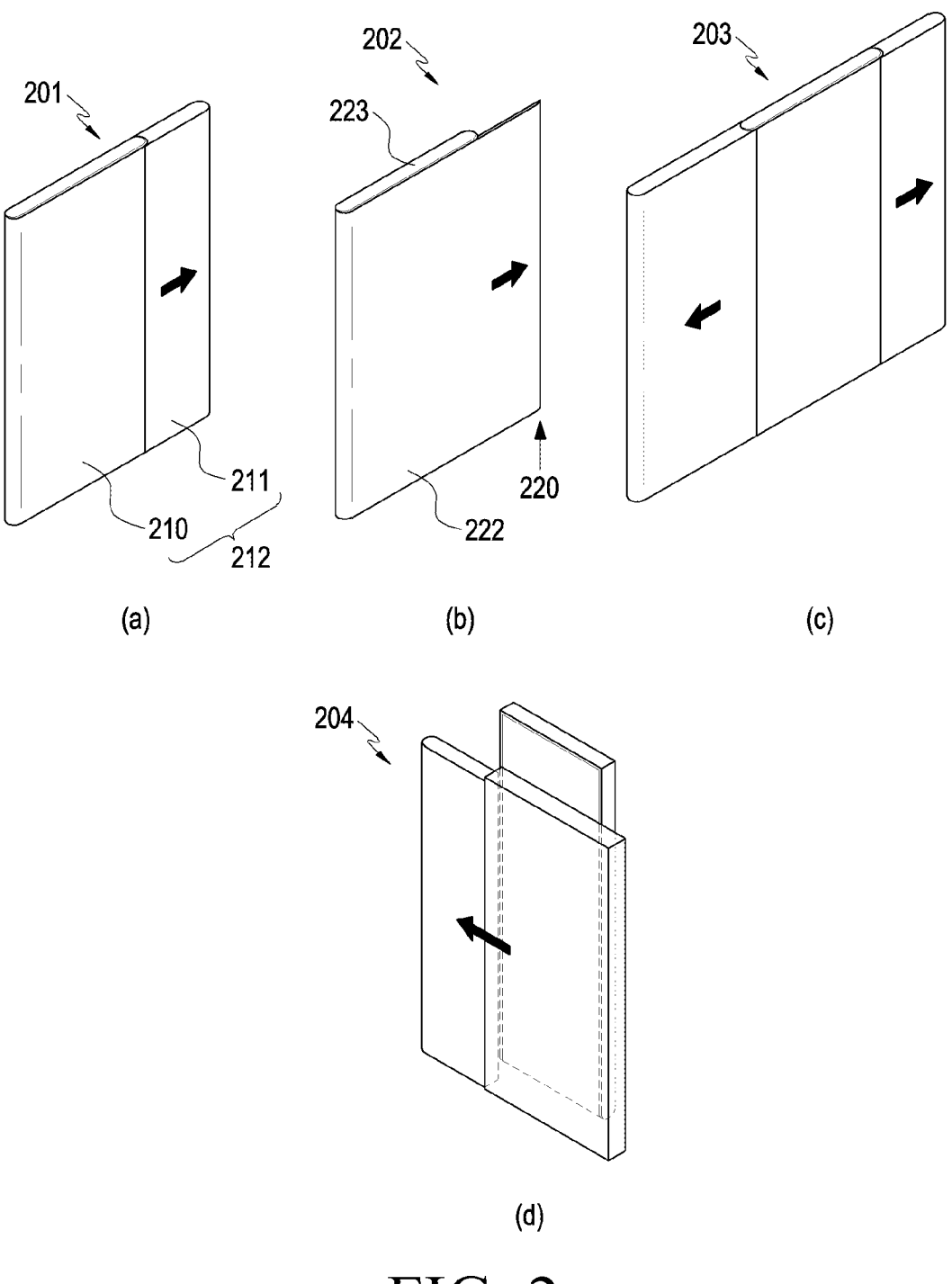
FIG. 2 is a diagram illustrating various types of slidable electronic devices according to an example embodiment.

FIG. 2 is a diagram illustrating various types of slidable electronic devices according to an embodiment. According to various embodiments, an electronic device 201, 202, 203, or 204 in FIG. 2 (e.g., the electronic device 101 in FIG. 1) may include a housing, a display (e.g., the display module 160 in FIG. 1, including a display), and at least one processor (e.g., the processor 120 in FIG. 1) operatively connected, directly or indirectly, to the display.

According to various embodiments, at least a part of the display may be exposed to the outside through the housing. According to an embodiment, the display may include one or more displays. According to various embodiments, the display may include an unfold display (e.g., a flat display or an edge display) which is not bendable or a flexible display (e.g., a foldable display, rollable display, or a stretchable display). Hereinafter, a display is described as a flexible display, but is not limited thereto, and an unfold display may be applied.

According to various embodiments, at least one processor for performing and controlling a function of the electronic device 201, 202, 203, or 204 and a memory (e.g., the memory 130 in FIG. 1) may be disposed inside the housing.

According to various embodiments, a state in which an exposed area of the flexible display is smallest may be referred to as a "closed state" and a state in which an exposed area of the flexible display is largest may be referred to as an "open state".

According to various embodiments, referring to FIG. 2(*a*), at least a part of the flexible may be inserted into the housing or withdrawn from the housing according to a sliding operation. For example, in the closed state of the slidable electronic device 201, in case that a sliding extension command is received, a part of the flexible display positioned inside the housing may be slid to the outside of the housing to be the open state. For example, the exposed part 210 of the flexible display in the closed state of the electronic device 201 may be referred to a first portion, and the exposed part 210 of the flexible display in the open state of the electronic device 201 may be referred to a second portion. For example, the second portion 212 may be an area obtained by adding an extended area 211 of the flexible display to the first portion according to a sliding extension operation. For example, the flexible display disposed on the housing of the flexible display may be in a fixed state.

According to various embodiments, in the open state of the slidable electronic device 201, in case that a sliding reduction command is received, a part of the flexible display positioned outside the housing may be slid to the inside of the housing to be the closed state. For example, the exposed part 212 of the flexible display in the open state of the electronic device 201 may be referred to as a first portion, and the exposed part 210 of the flexible display in the closed state of the electronic device 201 may be referred to a second portion. For example, in the first portion, an exposed portion 210 of the flexible display after a part 211 of the flexible display is inserted into the housing according to the sliding reduction operation may be the second portion.

According to various embodiments, referring to FIG. 2(*b*), the flexible display may be disposed in a form to surround at least part of a front surface, one lateral surface, and a rear surface of the electronic device 202.

For example, in the closed state of the slidable electronic device 202, in case that a sliding extension command is received, the flexible display may be moved so that an edge portion 220 of the flexible display disposed on the front surface of the electronic device 202 moves in a direction to deviate the housing of the electronic device 202. For example, the electronic device 202 may drive a roller (not shown) for moving the flexible display. A part of the flexible display disposed on the rear surface 223 of the electronic device 202 move to the front surface of the electronic device 202 according to moving of the flexible display so that an exposed portion 222 of the flexible display may extend. For example, the flexible display disposed on the housing of the flexible display may move. According to various embodiments, a state in which the exposed portion 222 of the flexible display is largest may be referred to as an open state.

According to various embodiments, in the open state of the slidable electronic device 202, in case that a sliding reduction command is received, the roller (not shown) may be driven so that the edge portion 220 of the flexible display disposed on the front surface of the electronic device 202 moves toward the housing from an area deviating the housing of the electronic device 202. According to driving of the roller, a part of the flexible display disposed on the front surface of the electronic device 202 may move to the rear surface 223 of the electronic device 202 so that an exposed portion of the flexible display may be reduced. A state in which the exposed portion of the flexible display is smallest may be referred to as a closed state.

According to various embodiments, the flexible display of the slidable electronic device 202 may be disposed to be inserted into the housing of the electronic device 202 rather than the rear surface of the electronic device 202 in an area surrounding one lateral surface of the electronic device 202.

Figure 3A:
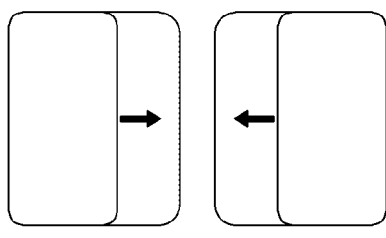
FIG. 3A is a diagram illustrating a sliding operation of a flexible display of an electronic device according to various example embodiments.
Figure 3B:
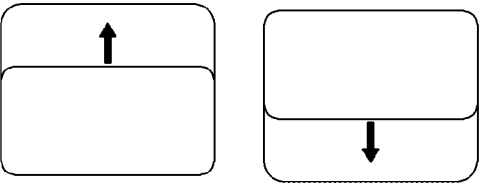
FIG. 3B is a diagram illustrating a sliding operation of a flexible display of an electronic device according to various example embodiments.

In FIG. 2(*a*) and FIG. 2(*b*), it is described that the flexible display extends to the right of the electronic device 201, 202, but is not limited thereto. For example, as shown in FIG. 3A, the flexible display may extend or be reduced to the right or the left of the electronic device 201, 202. For another example, as shown in FIG. 3B, in case that the electronic device 201, 202 is disposed in the horizontal direction, the flexible display may be extended or reduced to the top or the bottom of the electronic device 201, 202.

In FIG. 2(*a*) and FIG. 2(*b*), it is described that a long side of the flexible display of the rectangular electronic device 201, 202 moves so that the flexible display is extended or reduced, but is not limited thereto. For example, as shown in FIG. 3C, a short side of the flexible display of the rectangular electronic device 201, 202 may move so that the flexible display is extended or reduced.

Figure 3C:
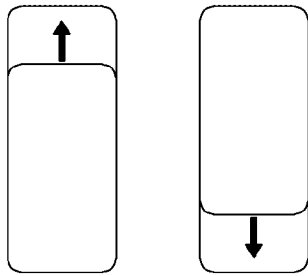
FIG. 3C is a diagram illustrating a sliding operation of a flexible display of an electronic device according to various example embodiments.

In FIG. 3C, it is described that the rectangular electronic device 201, 202 is disposed in a vertical direction (e.g., a portrait mode) and the short side of the flexible display moves upward or downward so that the flexible display is extended or reduced, but is not limited thereto. For example, the rectangular electronic device 201, 202 may be disposed in a horizontal direction (e.g., a landscape mode) and the short side of the flexible display may be move leftward or rightward so that the flexible display is extended or reduced.

Figures 3D, 3E, 3F:
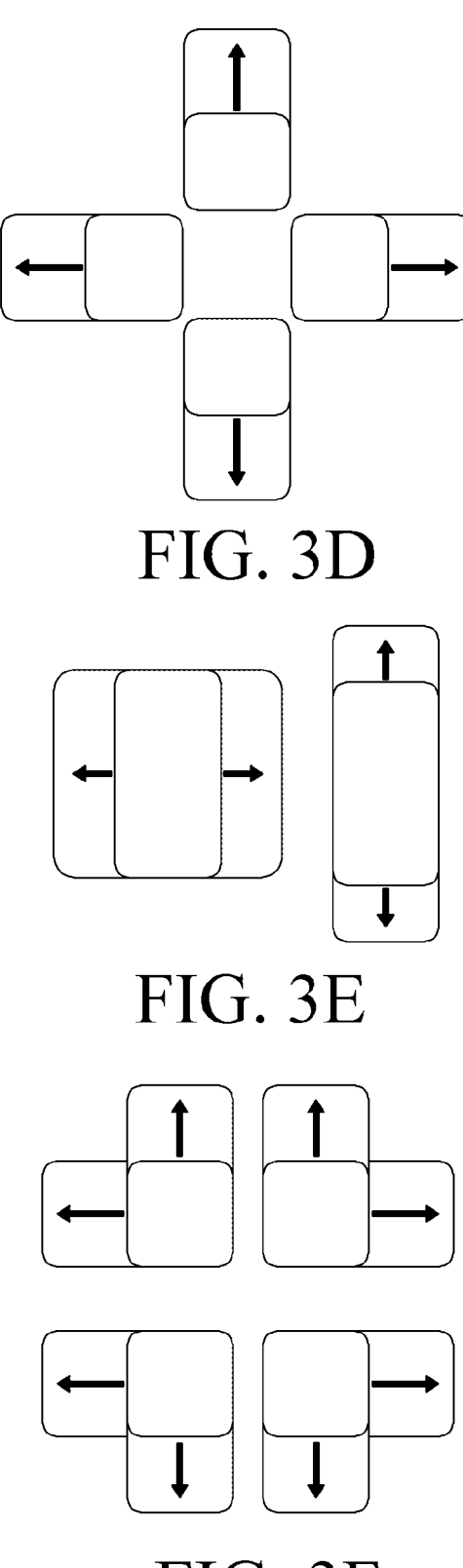
FIG. 3D is a diagram illustrating a sliding operation of a flexible display of an electronic device according to various example embodiments.
FIG. 3E is a diagram illustrating a sliding operation of a flexible display of an electronic device according to various example embodiments.
FIG. 3F is a diagram illustrating a sliding operation of a flexible display of an electronic device according to various example embodiments.

In FIG. 2(*a*) and FIG. 2(*b*), it is described that the electronic device 201, 202 has a rectangular shape, but is not limited thereto. For example, as shown in FIG. 3D, the electronic device 201, 202 may have a square shape. For example, the electronic device 201, 202 may extend or reduce the flexible display by moving one side of the flexible up, down, right, or left.

In FIG. 2(*a*) and FIG. 2(*b*), it is described that the flexible display is extended or reduced in one direction of the electronic device 201, 202, but is not limited thereto. For example, referring to FIG. 2(*c*), the slidable electronic device 203 may be extended or reduced in opposite directions.

According to various embodiments, the electronic device 203 may extend or reduce the flexible display only in one of opposite directions or extend or reduce the flexible display in opposite directions.

In FIG. 2(*c*), it is described that the flexible display is extended or reduced by moving in opposite directions (e.g., the left and the right) of opposite long sides of the flexible display of the rectangular electronic device 203, but is not limited thereto. For example, as shown in FIG. 3E, short sides of the flexible display of the rectangular electronic device 203 may move in opposite directions (e.g., the top and the bottom) so that the flexible display is extended or reduced.

In FIG. 2(*c*) and FIG. 3E, it is described that the rectangular electronic device 203 is disposed in a vertical direction, but is not limited thereto. According to various embodiments, the electronic device 203 may be a square shape.

In FIG. 2(*c*), it is described that the flexible display is extended or reduced in opposite directions, but is not limited thereto. For example, referring to FIG. 2(*d*), the slidable electronic device 204 may be extended or reduced in two directions (e.g., one of the left or the right and one of the top or the bottom) rather than the opposite directions.

For example, referring to FIG. 3F, the electronic device 204 slidable in two directions may extend or reduce the flexible display in the left and up direction, the left and downward directions, the right and upward directions, or the right and downward directions.

According to various embodiments, the slidable electronic device 204 may extend or reduce the flexible display through a sliding operation of a part of the flexible display disposed in the housing in two directions. For another example, the electronic device 204 may extend or reduce the flexible display through a sliding operation of a part of the flexible display disposed in the housing in one direction as shown in FIG. 2(*a*), and may extend or reduce the flexible display by moving flexible display to the front surface or the rear surface of the electronic device 204 in the other direction in a state in which the flexible display surrounds at least a part of the front surface, one lateral surface, and rear surface of the electronic device 204 as shown in FIG. 2(*b*).

In FIG. 2(*d*) and FIG. 3F, it is described that the flexible display is extended or reduced in two directions, but is not limited thereto, and the flexible display may be extended or reduced in three or four directions.

Figure 4:
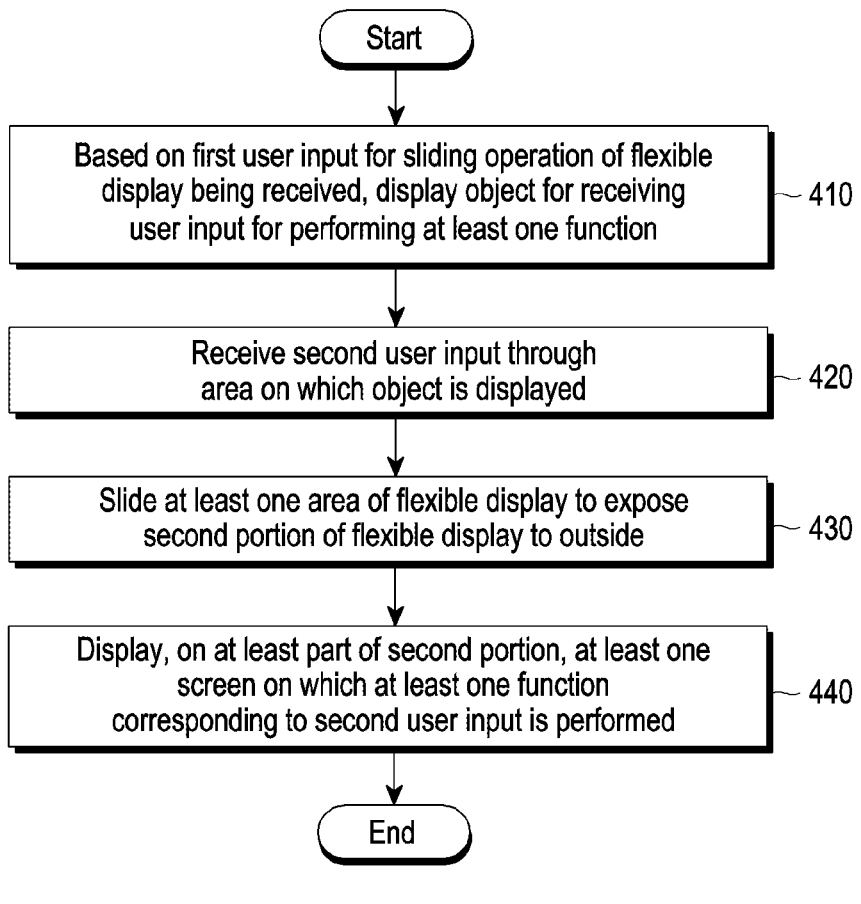
FIG. 4 is a diagram illustrating an operation of an electronic device performing a sliding operation and function according to a user input according to an example embodiment.

FIG. 4 is a diagram illustrating an operation of an electronic device performing a sliding operation and function according to a user input according to an embodiment.

Referring to FIG. 4, according to various embodiments, in operation 410, in case that a first user input for a sliding operation of a flexible display (e.g., the display module 160 in FIG. 1) is received, an electronic device (e.g., the electronic device 101 or the processor 120 in FIG. 1) may display a screen for receiving a user input for performing at least one function.

For example, in a state in which a first portion of the flexible display is exposed to the outside, in case that the first user input for a sliding operation to allow a second portion including at least a part of the first portion to be exposed to the outside is received, the electronic device may display an object for receiving a user input for performing at least one function.

For example, the object for receiving a user input may include an input layer (e.g., a screen) additionally generated on a screen currently displayed. According to various embodiments, the object for receiving a user input may be displayed on a whole area or a partial area of the first portion of the flexible display. According to various embodiments, the object for receiving a user input may be a translucent screen or transparent screen through which a currently displayed screen is seen.

According to various embodiments, the object for receiving a user input may include a guide UI for a second user input (e.g., a dot pattern or a drawing pattern).

According to various embodiments, the first user input for a sliding operation of the flexible display may correspond to inputting a command for extension sliding by which an exposed area of the flexible display increases or for reduction sliding by which an exposed area of the flexible display decreases.

According to various embodiments, in case that the first user input is received, the electronic device may control a component (e.g., at least one of a roller, a roller driving part, an actuator, or a sliding driving part) for changing a size of an exposed area of the flexible display through an electrical signal so as to change the size of the exposed area of the flexible display without a physical input (e.g., an operation of pulling or pushing the flexible display) of a user.

According to various embodiments, in case that the flexible display slides to be extended, the exposed second portion of the flexible display may include the first portion. An embodiment in which the flexible display slides to be extended will be described with reference to FIG. 5A below.

According to various embodiments, in case that the flexible display slides to be reduced, the exposed second portion of the flexible display may correspond to a part of the first portion. An embodiment in which the flexible display slides to be reduced will be described with reference to FIG. 5B below.

Figure 7:
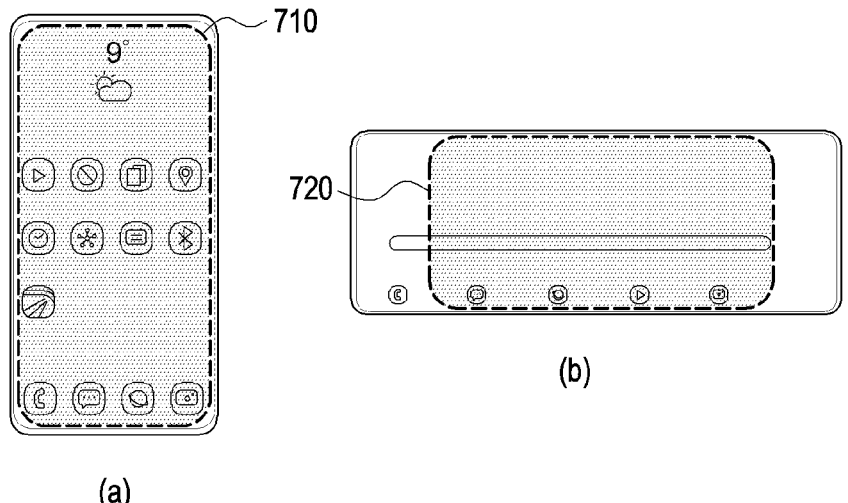
FIG. 7 is a diagram illustrating a screen for receiving a user input for performing a function according to various example embodiments.

According to various embodiments, in case of identifying that the first user input for a sliding operation of the flexible display is received, the electronic device may display an object for receiving a user input for performing at least one function. For example, the object for receiving a user input for performing at least one function may be displayed on at least a part of the flexible display. By displaying the object for receiving a user input for performing at least one function, the electronic device may notify a user that it is a state capable of receiving a user input. Various embodiments of the object for receiving a user input for performing at least one function will be described with reference to FIG. 7 below.

According to various embodiments, in case that the first user input is received, the electronic device may additionally perform a user recognition operation. For example, the electronic device 101 may perform the user recognition operation whenever the first user input is received or may perform the user recognition operation in case that a predetermined condition is satisfied after reception of the first user input. For example, the predetermined condition may be a case in which the first user input is received through a lock screen. An operation of the electronic device according to the user recognition operation and a user recognition result will be described with reference to FIG. 16A to FIG. 18 below.

According to various embodiments, in operation 420, the electronic device may receive a second user input through an area on which the object is displayed. For example, the second user input may be previously mapped with a function by a user and stored. According to various embodiments, one second user input may be mapped with one or more functions. According to various embodiments, the function may include application execution, payment function execution, other user account execution, or other modes (e.g., a smartphone mode, a tablet PC mode, or a kid mode).

For example, the second user input input through the area on which the object is displayed may include at least one of a dot pattern input, a pattern drawing input, a handwriting input, an icon selection, a specific location selection, a voice input, or a gesture input corresponding to a function to be executed. Various embodiments of the second user input will be described with reference to FIG. 8 to FIG. 9C below.

According to various embodiments, the second user input may include an input for user recognition. For example, in case that user information is mapped to a function and stored in advance by a user, the electronic device may receive an input (e.g., a fingerprint input, a voice input, or a face input) for user recognition as the second user input in a state in which the object is displayed. An operation of the electronic device according to the input operation for user recognition and a user recognition result will be described with reference to FIG. 16A to FIG. 18 below.

According to various embodiments, in case that the second user input is not an input for user recognition, the electronic device may additionally perform a user recognition operation after the second user input is received. For example, in case that a function corresponding to the received second user input requires releasing security (e.g., login or user authentication), the electronic device may additionally perform a user recognition operation.

According to various embodiments, in operation 430, the electronic device may slide at least one area of the flexible display to expose the second portion of the flexible display to the outside. For example, in case that the second user input is received, the electronic device may slide at least one area of the flexible display to expose the second portion of the flexible display to the outside. For example, in case that the second user input (e.g., a touch input) ends, the electronic device may automatically slide at least one area of the flexible display to expose the second portion of the flexible display.

According to various embodiments, in operation 440, the electronic device may display at least one screen on which at least one function corresponding to the second user input is performed, on at least a part of the second portion.

For example, the electronic device may display at least one screen on which at least one function corresponding to the second user input is performed in a split screen of at least a part of the second portion, in a pop-up screen, or in full screen of the second portion. For example, the screen on which at least one function corresponding to the second user input is performed may include at least one of at least one application execution screen corresponding to the second user input, a payment function execution screen, another user account execution screen, or another mode (e.g., a smartphone mode, a tablet PC mode, or a kid mode) execution screen.

According to various embodiments, a display type of a screen on which a function is performed, a corresponding function, and the second user input may be mapped by user configuration and stored. For another embodiment, in case that there is no display type of a screen mapped with the second user input and the corresponding function, the electronic device may display a screen for selection of a display type of the screen on which at least one function corresponding to the second user input is performed after receiving the second user input and receive a user selection for the display type. According to various embodiments, the electronic device may display a screen for selection of a display type of a screen on which at least one function is performed based on a display type frequently used by a user. Various embodiments of the at least one screen on which at least one function corresponding to the second user input is performed will be described with reference to FIG. 10A to FIG. 15B below.

According to various embodiments, the electronic device may display a screen on which at least one function corresponding to the second user input is performed after the sliding operation of the flexible display is completed, or may display a screen on which at least one function corresponding to the second user input is performed during performing the sliding operation of the flexible display.

For example, in case of sliding to be extended, the electronic device may display a screen on which at least one function corresponding to the second user input is performed on at least a part of the second portion after changing of an exposed area of the flexible display from the first portion to the second portion larger than the first portion is completed. For another example, while the flexible display is sliding to be extended, the electronic device may display a screen on which at least one function is performed to correspond to an extending area other than the first portion.

For another example, in case of sliding to be reduced, the electronic device may display at least one screen on which at least one function corresponding to the second user input is performed on at least a part of the second portion after changing of an exposed area of the flexible display from the first portion to the second portion smaller than the first portion is completed. For another example, while the flexible display is sliding to be reduced, the electronic device may display at least one screen on which at least one function is performed on the second portion and progress a reduction sliding operation of an area other than the second portion.

According to various embodiments, in case that the second user input is not received for a predetermined time after a screen for receiving a user input for performing at least one function, the electronic device may perform no other functions and slide the flexible display while maintaining a function currently being performed. For example, in case that the second user input is not received, a screen displayed before the sliding operation according to the sliding operation of the flexible display may be displayed to be extended or reduced based on a size of an exposed area of the flexible or displayed to be changed in layout.

According to various embodiments, the electronic device may be connected to a slidable external electronic device and control the external electronic device based on the first user input and the second user input through the electronic device. An operation of controlling the slidable external electronic device will be described with reference to FIG. 19 to FIG. 21 below.

Figure 5A:
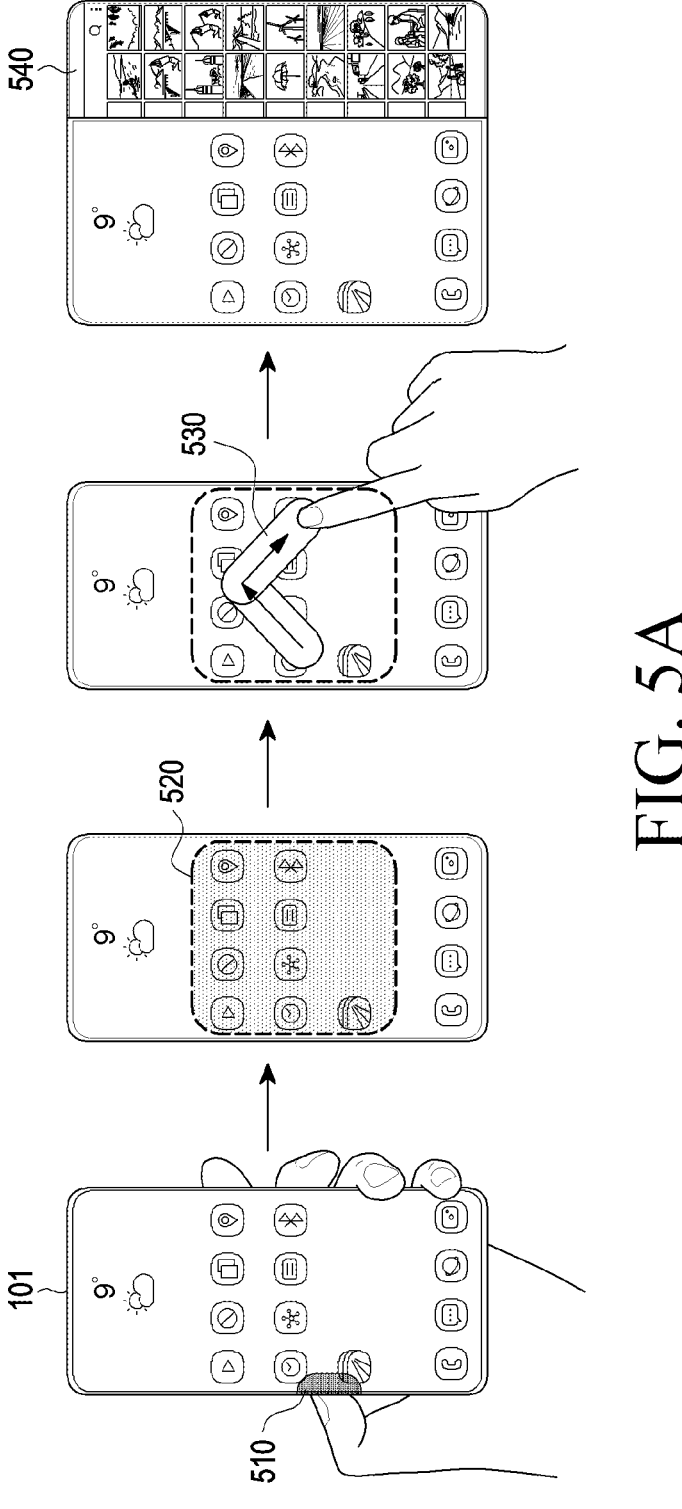
FIG. 5A is a diagram illustrating an operation of an electronic device performing a sliding operation and function according to a user input according to an example embodiment.
Figure 5B:
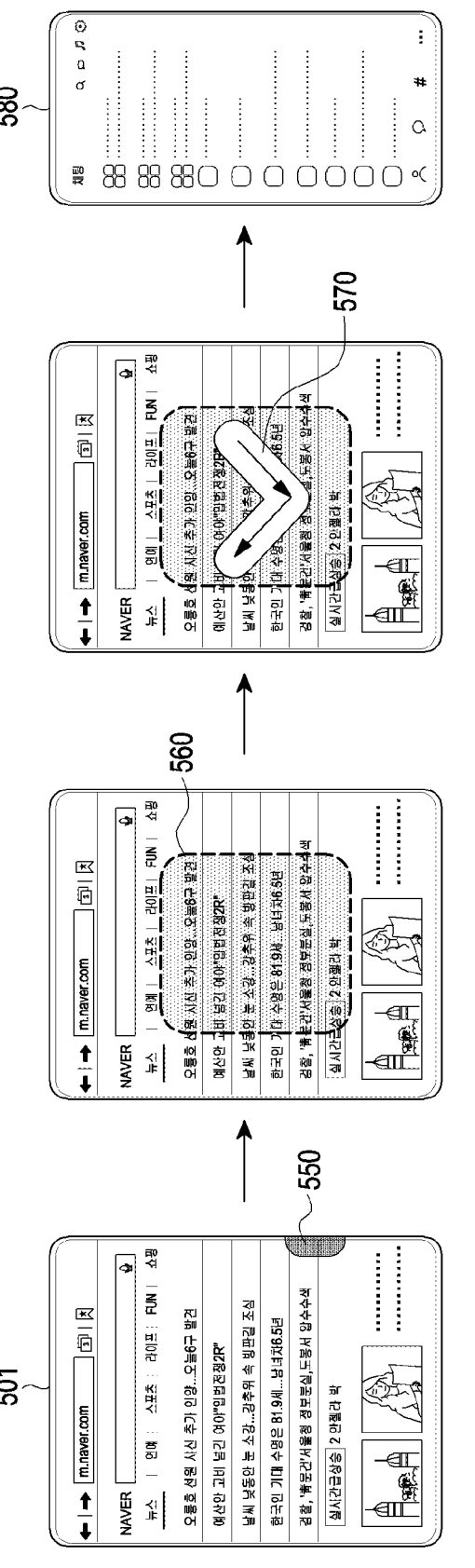
FIG. 5B is a diagram illustrating an operation of an electronic device performing a sliding operation and function according to a user input according to an example embodiment.

FIG. 5A is a diagram illustrating an operation of an electronic device performing a sliding operation and function according to a user input according to an embodiment. FIG. 5B is a diagram illustrating an operation of an electronic device performing a sliding operation and function according to a user input according to an embodiment. According to various embodiments, FIG. 5A illustrates an extension sliding operation of a flexible display and FIG. 5B illustrates a reduction sliding operation of a flexible display.

For example, referring to FIG. 5A, in case that a first user input 510 for a sliding operation of a flexible display (e.g., the display module 160 in FIG. 1) is received in a state (e.g., a closed state) that a first portion of the flexible display is exposed, the electronic device 101 (e.g., the electronic device 101 or the processor 120 in FIG. 1) may display an object 520 for receiving a user input for performing at least one function. For example, the first user input 510 may include an operation of long-press touching an area of an edge area of the flexible display.

According to various embodiments, the first user input 510 for the sliding operation of the flexible display is not limited to the operation of long-press touching an area of the edge area of the flexible display and various embodiments of the first user input 510 will be described with reference to FIG. 6 below.

According to various embodiments, the object 520 for receiving a user input for performing at least one function may be displayed on a partial area of the exposed first portion of the flexible display. The object 520 may be visually distinguished from a screen being displayed on the first portion of the flexible display and there is no limitation on a shape of the object 520. While the object 520 is being displayed, an object (e.g., an icon) displayed to at least overlap the object 520 on a screen may be deactivated so that the touching the object (e.g., an icon) being displayed on a screen may not cause any functions related to the object (e.g., an icon) to be performed. Alternatively, the electronic device 101 may be implemented not to display the object 520. Here, the object (e.g., an icon) included a screen being displayed on the first portion of the electronic device 101 may be deactivated and thus the touching the object (e.g., an icon) on a screen may not cause any functions related to the object (e.g., an icon) to be performed.

According to various embodiments, as shown in FIG. 7A, an object 710 for receiving a user input for performing at least one function may be displayed on the entire area of an exposed first portion of a flexible display (e.g., the display module 160 in FIG. 1, including a display). According to various embodiments, referring to FIG. 7B, even in case that a first user input is received in a state that the flexible display of an electronic device (e.g., the electronic device 101 or the processor 120 in FIG. 1) is horizontally long, the electronic device may display the object 720 for receiving a user input for performing at least one function on a partial area of the exposed first portion of the flexible display. According to various embodiments, even in case that a first user input is received in a state that the flexible display of the electronic device is horizontally long, the electronic device may display the object for receiving a user input for performing at least one function on the entire area of the exposed first portion of the flexible display.

According to various embodiments, referring to FIG. 5A again, in case that the second user input 530 is received through an area on which an object 520 for receiving a user input for performing at least one function is displayed, the electronic device 101 may display a screen 540 obtained by performing at least one function corresponding to the second user input 530 on at least a partial area of the exposed second portion of the flexible display.

In FIG. 5A, it is described that the electronic device displays the screen on which at least one function is performed in a form of a split screen on an area excluding a first portion of the exposed second portion of the flexible display, but the display type is not limited thereto. Various embodiments of a display type of the screen on which at least one function corresponding to the second user input is performed will be described with reference to FIG. 10A to FIG. 15B below.

According to various embodiments, referring to FIG. 5B, in case that a first user input 550 for a sliding operation of a flexible display (e.g., the display module 160 in FIG. 1) is received in a state (e.g., an open state) that a first portion of the flexible display is exposed, the electronic device 101 (e.g., the electronic device 101 or the processor 120 in FIG. 1) may display an object 560 for receiving a user input for performing at least one function. For example, the first user input 550 may include an operation of long-press touching an area of an edge area of the flexible display. According to various embodiments, the object 560 of FIG. 5B may perform the same function as the object 520 of FIG. 5A.

According to various embodiments, the first user input 550 for the sliding operation of the flexible display is not limited to the operation of long-press touching an area of the edge area of the flexible display and various embodiments of the first user input 550 will be described with reference to FIG. 6 below.

According to various embodiments, the object 560 for receiving a user input for performing at least one function may be displayed on a partial area of the exposed first portion of the flexible display. The object 560 for receiving a user input for performing at least one function is not limited to the display area of FIG. 5B, and may be displayed on the entire area as shown in FIG. 7A or may be displayed on a partial area or the entire area (not shown) of the exposed first portion of the flexible display as shown in FIG. 7B. An overlapping description with respect to FIG. 7A and FIG. 7B will be omitted.

According to various embodiments, referring to FIG. 5B again, in case that the second user input 570 is received through an area on which an object 560 for receiving a user input for performing at least one function is displayed, the electronic device 101 may display a screen 580 on which at least one function corresponding to the second user input 570 is performed on at least a partial area of the exposed second portion of the flexible display.

In FIG. 5B, it is described that the electronic device displays the screen 580 on which at least one function is performed in a form of full screen on the exposed second portion of the flexible display, but the display type is not limited thereto. Various embodiments of a display type of the screen on which at least one function corresponding to the second user input is performed will be described with reference to FIG. 10A to FIG. 15B below.

According to various embodiments, even in case that both the first user input 510 for the extension sliding operation of the flexible display and the first user input 550 for the reduction sliding operation are operations for long-press touching an area of the edge area of the flexible display, the electronic device determine whether to slide the flexible display to be extended or reduced according to a long-press touching input based on a state (e.g., an open state or a closed state) of the flexible display when the first user input 510 or 550 is input. According to various embodiments, the first user input 510 for the extension sliding operation of the flexible display and the first user input 550 for the reduction sliding operation may have different manners.

In FIG. 5A and FIG. 5B, it is described that the object 520 for receiving a user input for performing at least one function is a screen for a dot pattern input, but is not limited thereto. Various embodiments of the object 520 for receiving a user input for performing at least one function and the second user input 530 will be described with reference to FIG. 8 to FIG. 9C below.

Figure 6:
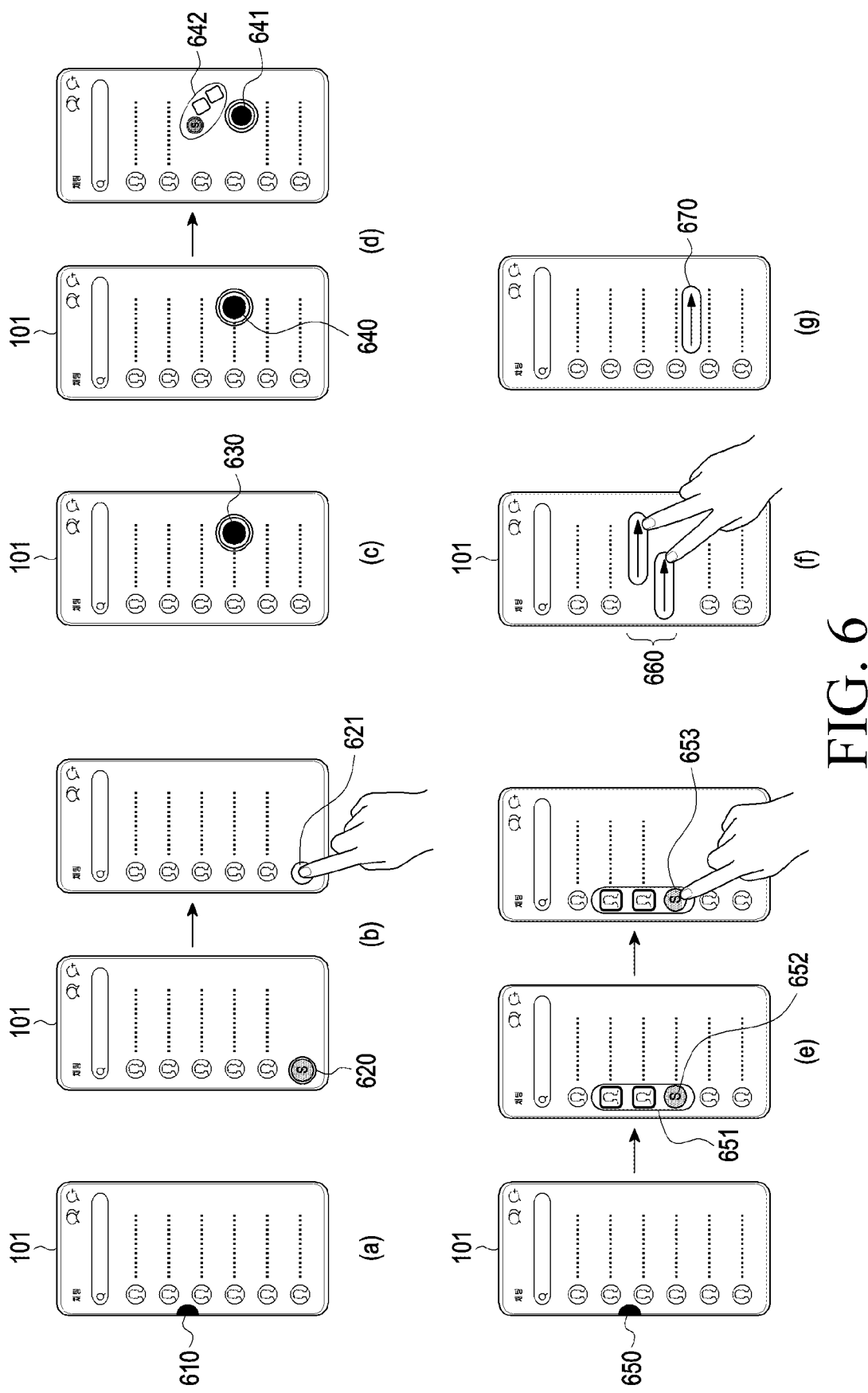
FIG. 6 is a diagram illustrating a user input for a sliding operation of an electronic device according to various example embodiments.

FIG. 6 is a diagram illustrating a user input for a sliding operation of an electronic device according to various embodiments.

According to various embodiments, referring to FIG. 6(*a*), in case that an input for long-press touch 610 of an area of the edge area of a flexible display (e.g., the display module 160 in FIG. 1) is received, the electronic device 101 (e.g., the electronic device 101 or the processor 120 in FIG. 1) may identify that a user input for a sliding operation is input. According to various embodiments, in case that a user input for long-pressing touching an area of the edge area and then dragging (or swiping) in a direction is received, the electronic device 101 may identify that a user input for a sliding operation is received.

According to various embodiments, referring to FIG. 6(*b*), in case that an input for touching 621 a user interface 620, which is always displayed on the flexible display, for a sliding operation is received, the electronic device 101 may identify that a user input for a sliding operation is received.

According to various embodiments, referring to FIG. 6(*c*), in case that a pressure touch 630 greater than or equal to a preconfigured value is received through the flexible display, the electronic device 101 may identify that a user input for a sliding operation is received. For example, the electronic device 101 may detect a pressure touch input through the flexible display by using a pressure sensor. According to various embodiments, in case that a pressure touch is input through a preconfigured partial area or the entire exposed area of the flexible display, the electronic device 101 may identify that a user input for a sliding operation is received.

According to various embodiments, referring to FIG. 6(*d*), in case that a long-press touch 640 is received through the flexible display, the electronic device 101 may display a user interface 641 including at least one icon. According to various embodiments, the user interface 641 including at least one icon may include an icon corresponding to a function frequently used by a user or a function configured by a user and may include an icon 642 for sliding the flexible display. According to various embodiments, in case that a touch for selecting the icon 642 for sliding the flexible display in the user interface 641 including at least one icon is received, the electronic device 101 may identify that a user input for a sliding operation is received.

According to various embodiments, referring to FIG. 6(*e*), the electronic device 101 may display an object 650 related to at least one function of the electronic device 101 on the edge area of the flexible display. According to various embodiments, in case that a user input for selecting the object 650 is received, the electronic device 101 may display a user interface 651 including at least one icon corresponding to at least one function. For example, the user input for selecting the object 650 may be an operation of touching the object 650 or touching and then dragging (swiping) the object 650. According to various embodiments, the user interface 651 including at least one icon may include an icon corresponding to a function frequently used by a user or a function configured by a user and may include an icon 652 for sliding the flexible display.

According to various embodiments, in case that a touch 653 for selecting the icon 652 for sliding the flexible display in the user interface 651 including at least one icon is received, the electronic device 101 may identify that a user input for a sliding operation is received.

According to various embodiments, referring to FIG. 6(*f*), in case that an input for multi-touching and dragging (or swiping) 660 is received through the flexible display, the electronic device 101 may identify that a user input for a sliding operation is received. For example, in case that a multi-touch of two areas on the flexible display is received and then an operation of continuously dragging (or swiping) the multi-touch is received, the electronic device 101 may identify that a user input for a sliding operation is received.

According to various embodiments, referring to FIG. 6(*e*), in case that an input for touching and dragging (or swiping) 670 is received through the flexible display, the electronic device 101 may identify that a user input for a sliding operation is received. For example, in case that a touch with respect to one area on the flexible display is received and then an operation of continuously dragging (or swiping) is received, the electronic device 101 may identify that a user input for a sliding operation is received.

FIG. 6 is merely an example of the user input for the sliding operation of the flexible display, without limitation thereto, and the user input for the sliding operation of the flexible display may be configured when the electronic device 101 is manufactured or configured by a user.

Figure 8:
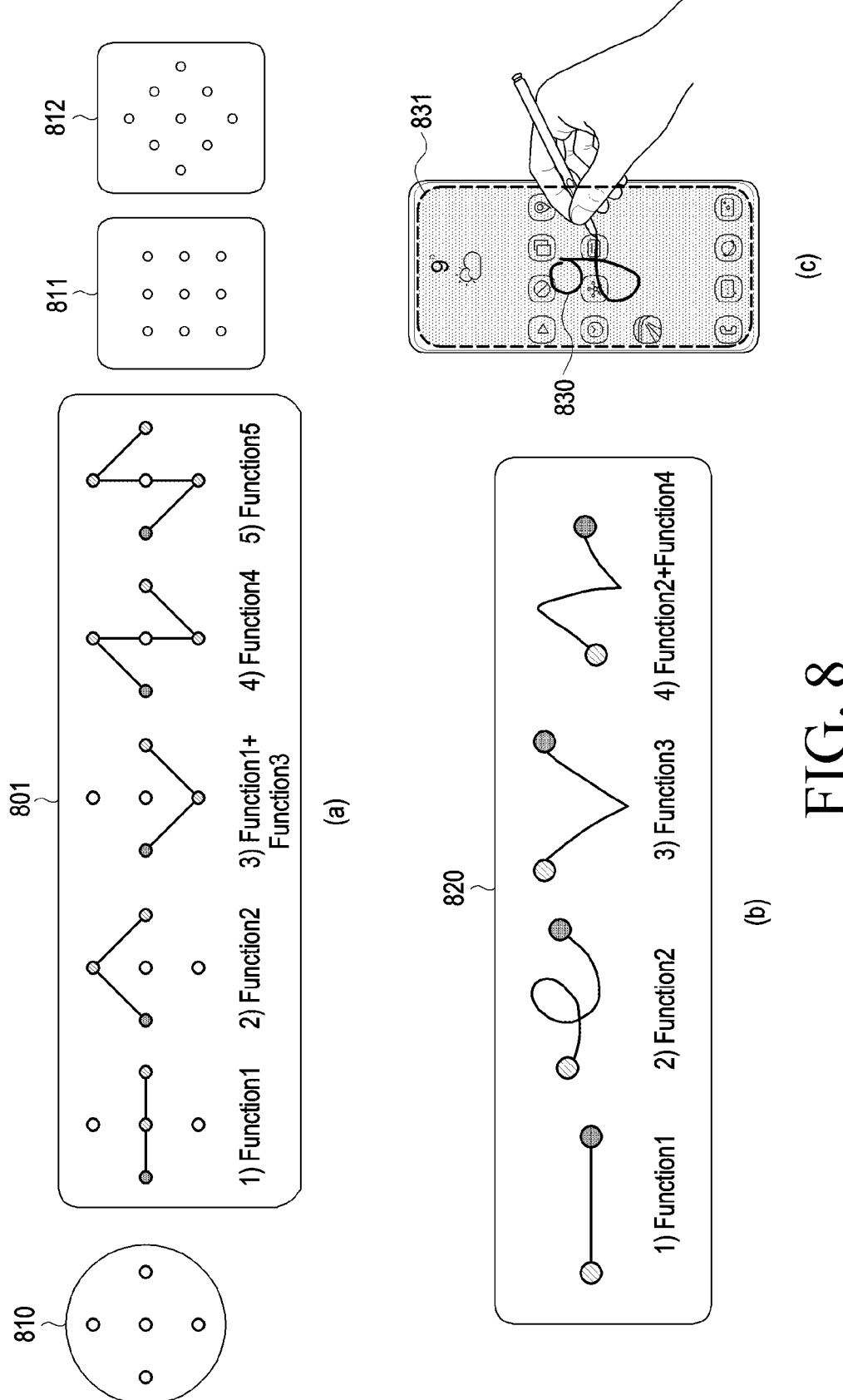
FIG. 8 is a diagram illustrating a user input for performing a function according to various example embodiments.

FIG. 8 is a diagram illustrating a user input for performing a function according to various embodiments. FIG. 8(*a*) illustrates various embodiments of a dot pattern input, FIG. 8(*b*) illustrates various embodiments of a drawing input, and FIG. 8(*c*) illustrates an embodiment of a handwriting input.

According to various embodiments, referring to FIG. 8(*a*), in case that a first user input is received, an electronic device (e.g., the electronic device 101 or the processor 120 in FIG. 1) may display an object for receiving a second user input by including multiple dots for a dot pattern input thereto. For example, the dot pattern input may correspond to touching at least a part of the displayed multiple dots in a preconfigured order through continuous dragging. According to various embodiments, the dot pattern input may be input through a finger of a user or a digital pen.

For example, the multiple dots for the dot pattern input may include 5 dots 810 arranged vertically and horizontally, 9 dots 811 arranged in a 3*3 form, or 9 dots 812 arranged in a 3*3 form in a diamond shape. The number and arrangement form of dots is merely an example, but is not limited thereto.

For example, referring to FIG. 8(*a*), in case of explaining with reference to patterns which may be generated from the 5 dots 810 arranged vertically and horizontally, at least one pattern 801 which may be generated from the 5 dots 810 may be mapped to at least one function. For example, the function may include at least one of sliding operation performance, gallery application execution, messenger application execution, navigation application execution, map application execution, search application execution, or other user account execution, and the function that may be mapped to a pattern is not limited thereto. According to various embodiments, one or more functions may be mapped to one pattern.

According to various embodiments, a guide UI for at least one available pattern may be displayed on the 5 dots 810 displayed on an object for receiving the second user input. According to various embodiments, information with respect to a corresponding function may be displayed together with the guide UI. As such, user convenience may be improved.

According to various embodiments, referring to FIG. 8(b), in case that a first user input is received, an electronic device (e.g., the electronic device 101 or the processor 120 in FIG. 1) may display an object for receiving a second user input and receive a pattern drawing input. For example, the pattern drawing input may be a pattern input using a relative position of a touch start area and a touch end area, and a form of continuous drag between the touch start and the touch end. According to various embodiments, the pattern drawing input may be input through a finger of a user or a digital pen.

For example, referring to FIG. 8(b), at least one pattern 820 which may be generated by the pattern drawing input may be mapped to at least one function. For example, the function may include at least one of sliding operation performance, gallery application execution, messenger application execution, navigation application execution, map application execution, search application execution, or other user account execution, and the function that may be mapped to a pattern is not limited thereto. According to various embodiments, one or more functions may be mapped to one pattern.

According to various embodiments, a guide UI for at least one pattern available for an object for receiving the second user input may be displayed. According to various embodiments, information with respect to a corresponding function may be displayed together with the guide UI. As such, user convenience may be improved.

According to various embodiments, referring to FIG. 8(c), in case that a first user input is received, an electronic device (e.g., the electronic device 101 or the processor 120 in FIG. 1) may display an object 831 for receiving a second user input and receive a handwriting input 830. For example, the handwriting input may correspond to using a form of continuous dragging between a touch start and a touch end as a pattern. According to various embodiments, the electronic device may recognize the received handwriting input as text and identify a function corresponding to the recognition result. According to various embodiments, the handwriting input may be input through a finger of a user or a digital pen.

For example, referring to FIG. 8(b), at least one pattern which may be generated by the handwriting input may be mapped to at least one function. According to various embodiments, a handwriting input for a function name (e.g., an application name) itself or a predetermined character (e.g., an alphabet, a number, or a special character) may be mapped to at least one function.

For example, the function may include at least one of sliding operation performance, gallery application execution, messenger application execution, navigation application execution, map application execution, search application execution, or other user account execution, and the function that may be mapped to a pattern is not limited thereto. According to various embodiments, one or more functions may be mapped to one pattern.

According to various embodiments, a guide UI for at least one pattern available for an object 831 for receiving the second user input may be displayed. According to various embodiments, information with respect to a corresponding function may be displayed together with the guide UI. As such, user convenience may be improved.

According to various embodiments, the mapping between each of multiple patterns of FIG. 8(a) to FIG. 8(c) and at least one function may be configured when the electronic device is manufactured or configured through a user interface displayed on the electronic device by a user.

Figure 9A:
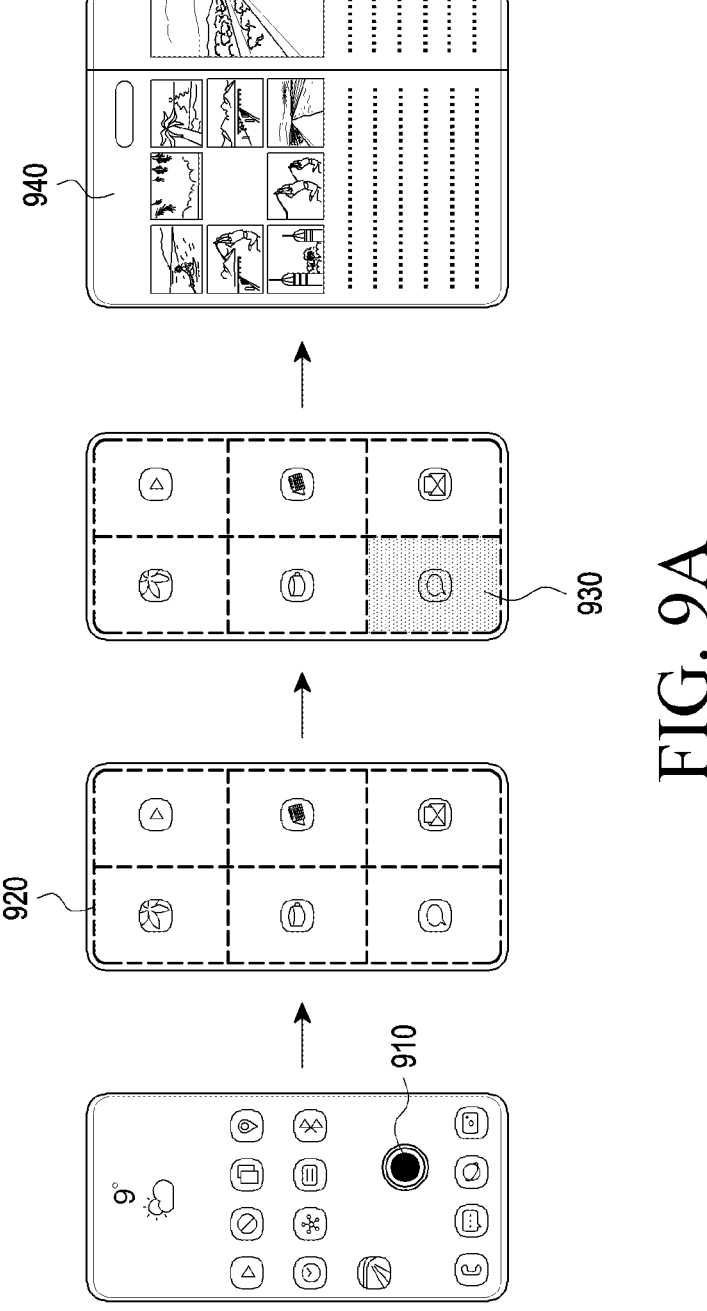
FIG. 9A is a diagram illustrating a user input for performing a function according to various example embodiments.

FIG. 9A is a diagram illustrating a user input for performing a function according to various embodiments.

According to various embodiments, referring to FIG. 9A, in case that a first user input 910 for a sliding operation of a flexible display (e.g., the display module 160 in FIG. 1) is received in a state that a first portion of the flexible display is exposed, an electronic device (e.g., the electronic device 101 or the processor 120 in FIG. 1) may display an object 920 for receiving a user input for performing at least one function.

For example, the object 920 for receiving a user input for performing at least one function may include multiple icons displayed on each split area and corresponding to functions.

According to various embodiments, in case that the second user input 930 for selecting one of split multiple areas or one of multiple icons is received, the electronic device may display a screen 940 on which a function corresponding to the icon displayed on the selected area is performed, on at least a part of the second portion of the flexible display. According to various embodiments, the second user input 930 may be a touch input or a drag (or swipe) input after a touch input.

In FIG. 9A, it is described that the screen 940 on which a function is performed is displayed on the full screen of the second portion, but the screen may be displayed in a split screen or in a pop-up screen according to user configuration or a user selection.

Figure 9B:
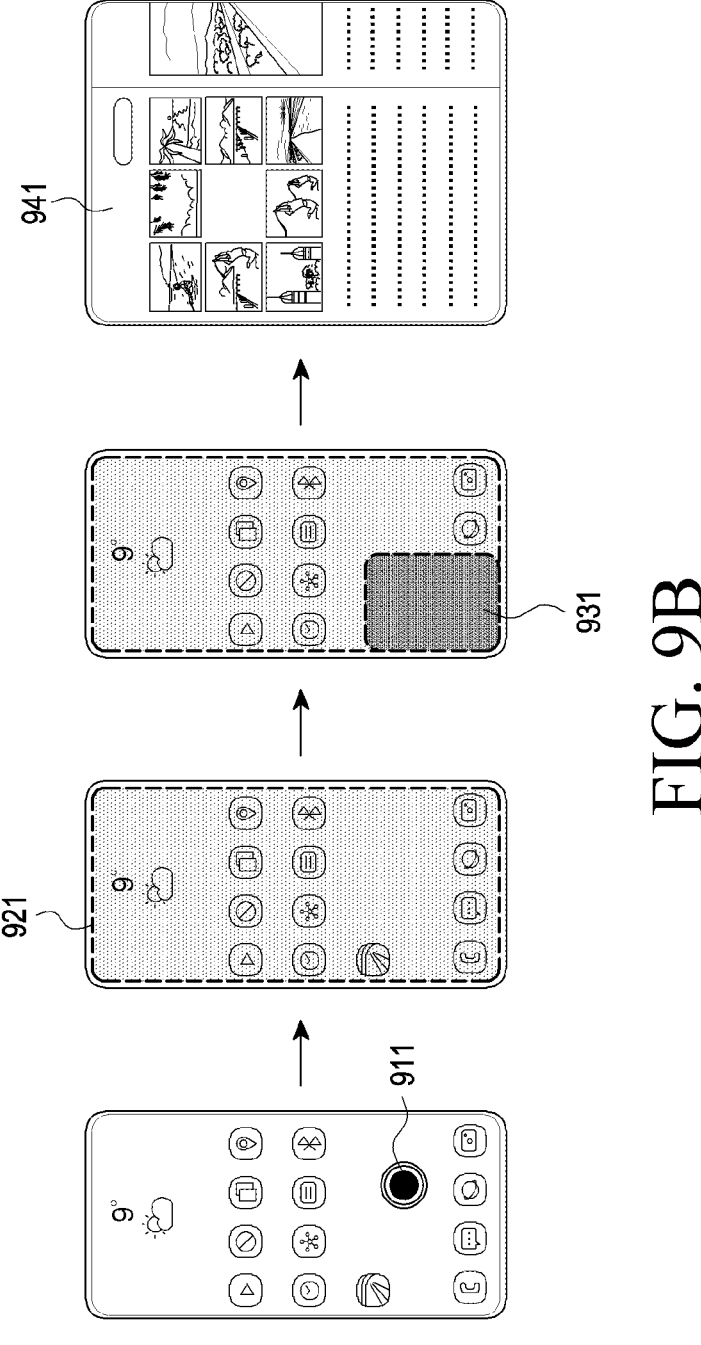
FIG. 9B is a diagram illustrating a user input for performing a function according to various example embodiments.

FIG. 9B is a diagram illustrating a user input for performing a function according to various embodiments.

According to various embodiments, referring to FIG. 9B, in case that a first user input 911 for a sliding operation of a flexible display (e.g., the display module 160 in FIG. 1) is received in a state that a first portion of the flexible display is exposed, an electronic device (e.g., the electronic device 101 or the processor 120 in FIG. 1) may display an object 921 for receiving a user input for performing at least one function.

For example, the object 921 for receiving a user input for performing at least one function may display split areas without displaying an icon corresponding to a function. According to various embodiments, it may not show that the area has been split.

According to various embodiments, in case that the second user input 931 for selecting one of split multiple areas is received, the electronic device may display a screen 941 on which a function corresponding to the icon displayed on the selected area is performed, on at least a part of the second portion of the flexible display. According to various embodiments, the second user input 931 may be a touch input or a drag (or swipe) input after a touch input.

In FIG. 9B, it is described that the screen 941 on which a function is performed is displayed on the full screen of the second portion, but the screen may be displayed in a split screen or in a pop-up screen according to user configuration or a user selection.

Figure 9C:
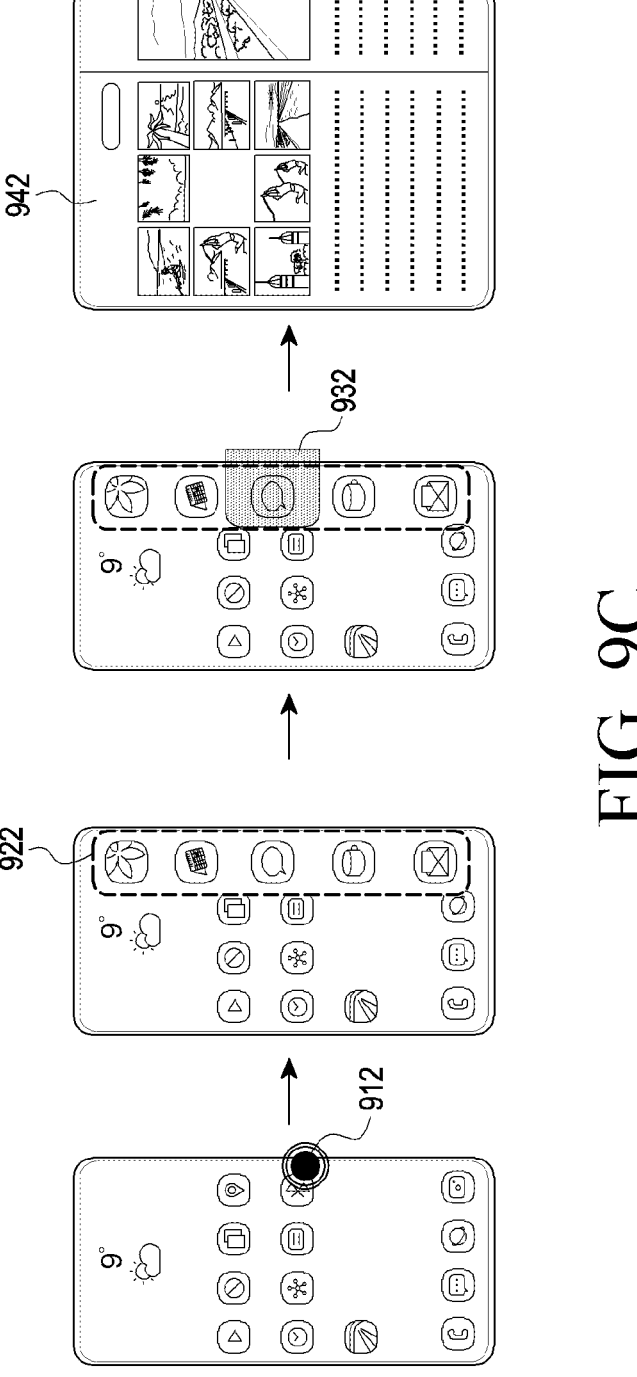
FIG. 9C is a diagram illustrating a user input for performing a function according to various example embodiments.

FIG. 9C is a diagram illustrating a user input for performing a function according to various embodiments.

According to various embodiments, referring to FIG. 9C, in case that a first user input 912 for a sliding operation of a flexible display (e.g., the display module 160 in FIG. 1) is received in a state that a first portion of the flexible display is exposed, an electronic device (e.g., the electronic device 101 or the processor 120 in FIG. 1) may display an object 922 for receiving a user input for performing at least one function. For example, the object 922 for receiving a user input for performing at least one function may be displayed on a partial area including one lateral edge area of the exposed first portion of the flexible display.

For example, the object 922 for receiving a user input for performing at least one function may include multiple icons corresponding to multiple functions, respectively.

According to various embodiments, in case that the second user input 932 for selecting one of multiple icons is received, the electronic device may display a screen 942 on which a function corresponding to the icon displayed on the selected area is performed, on at least a part of the second portion of the flexible display. According to various embodiments, the second user input 932 may be a touch input or a drag (or swipe) input after a touch input.

In FIG. 9C, it is described that the screen 942 on which a function is performed is displayed on the full screen of the second portion, but the screen may be displayed as in a split screen or in a pop-up screen according to user configuration or a user selection.

According to various embodiments, the object 922 for receiving a user input for performing at least one function in FIG. 9C may not be displayed. For example, in case that the second user input for selecting one area (e.g., upper, middle, or lower) of the object 922 for receiving a user input for performing at least one function is received, the electronic device may display a screen on which a function corresponding to the selected area is performed, on the second portion of the flexible display.

Figure 10A:
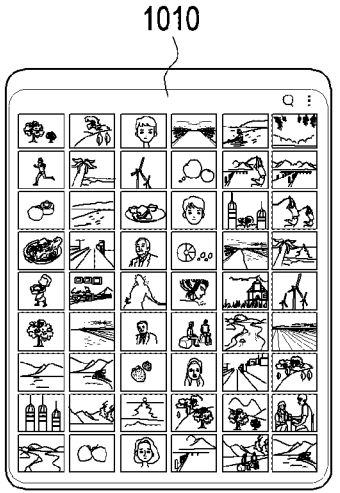
FIG. 10A is a diagram illustrating an operation of displaying a screen on which a function corresponding to a user input is performed, by an electronic device according to various example embodiments.
Figure 10B:
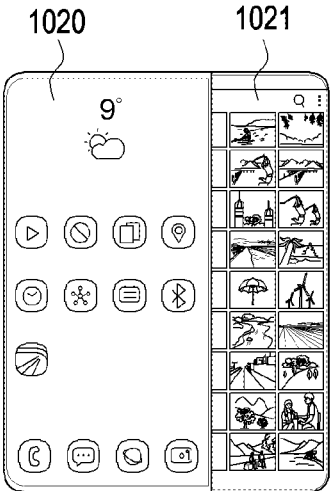
FIG. 10B is a diagram illustrating an operation of displaying a screen on which a function corresponding to a user input is performed, by an electronic device according to various example embodiments.
Figure 10C:
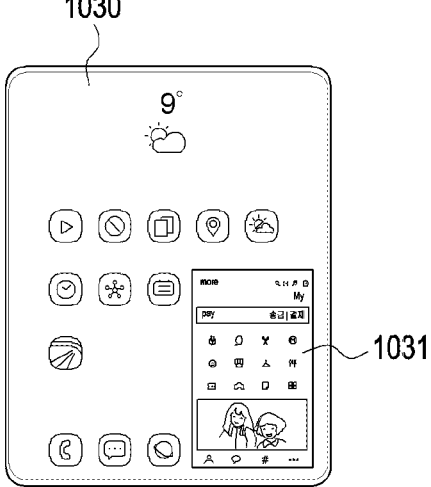
FIG. 10C is a diagram illustrating an operation of displaying a screen on which a function corresponding to a user input is performed, by an electronic device according to various example embodiments.
Figure 10D:
FIG. 10D is a diagram illustrating an operation of displaying a screen on which a function corresponding to a user input is performed, by an electronic device according to various example embodiments.
Figures 10E, 10F:
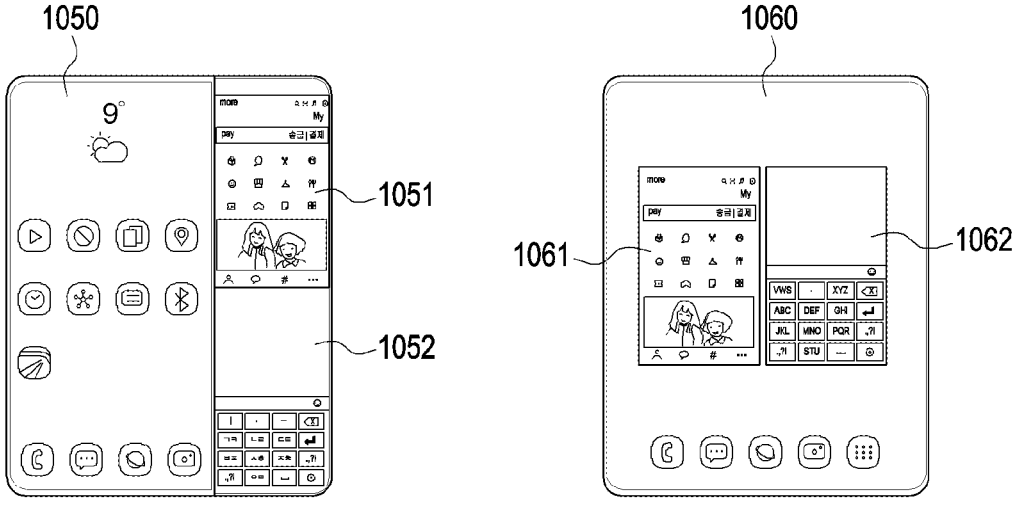
FIG. 10E is a diagram illustrating an operation of displaying a screen on which a function corresponding to a user input is performed, by an electronic device according to various example embodiments.
FIG. 10F is a diagram illustrating an operation of displaying a screen on which a function corresponding to a user input is performed, by an electronic device according to various example embodiment example.

FIG. 10A is a diagram illustrating an operation of displaying a screen on which a function corresponding to a second user input is performed, by an electronic device according to various embodiment. FIG. 10B is a diagram illustrating an operation of displaying a screen on which a function corresponding to a second user input is performed, by an electronic device according to various embodiment. FIG. 10C is a diagram illustrating an operation of displaying a screen on which a function corresponding to a second user input is performed, by an electronic device according to various embodiment. FIG. 10D is a diagram illustrating an operation of displaying a screen on which a function corresponding to a second user input is performed, by an electronic device according to various embodiment. FIG. 10E is a diagram illustrating an operation of displaying a screen on which a function corresponding to a second user input is performed, by an electronic device according to various embodiment. FIG. 10F is a diagram illustrating an operation of displaying a screen on which a function corresponding to a second user input is performed, by an electronic device according to various embodiment. According to various embodiments, FIG. 10A to FIG. 10C illustrate an embodiment in which one function corresponds to the second user input, and FIG. 10D to FIG. 10F illustrate an embodiment in which two or more functions correspond to the second user input.

According to various embodiments, referring to FIG. 10A, the electronic device may display a screen 1010 on which a function corresponding to the second user input is performed as the full screen of the exposed second portion of the flexible display.

According to various embodiments, referring to FIG. 10B, the electronic device may display a screen on which a function corresponding to the second user input is performed in a split screen on the exposed second portion of the flexible display. For example, the electronic device may maintain a screen 1020 having been displayed before the start of a sliding operation in an area corresponding to the first portion of the exposed second portion of the flexible display, and the electronic device may display a screen 1021 on which a function corresponding to the second user input is performed on the second portion excluding the first portion. The ratio of the split screen is not limited thereto.

According to various embodiments, the ratio of the split screen may be determined by user configuration in a process of mapping the second user input to the function. For another example, the ratio of the split screen may be changed by a user operation (e.g., long press and drag the border of the split area) in a state in which the split screen is displayed as shown in FIG. 10B.

According to various embodiments, referring to FIG. 10C, the electronic device may display a screen on which a function corresponding to the second user input is performed in a pop-up screen on a part of the exposed second portion. For example, the electronic device may maintain a screen 1030 having been displayed before the start of a sliding operation in the exposed second portion of the flexible display, and may display a screen 1031 on which a function corresponding to the second user input is performed on a partial area of the second portion in a pop-up form.

According to various embodiments, a size and form (e.g., a ratio of width and height of a pop-up screen) of the screen 1031 in a pop-up form may be determined by user configuration in a process of mapping the second user input to the function. For another example, a size and form of the screen in a pop-up form may be changed by a user operation (e.g., long press and drag the border of the screen in a pop-up form) in a state in which the screen in a pop-up form is displayed as shown in FIG. 10C.

According to various embodiments, referring to FIG. 10D, the electronic device may display three screens on which three functions corresponding to the second user input are performed, respectively, in a split screen on the exposed second portion of the flexible display.

For example, the electronic device may display a first screen 1040 corresponding to a first function corresponding to the second user input on an area corresponding to the first portion of the exposed second portion of the flexible display, and display a second screen 1041 corresponding to a second function and a third screen 1042 corresponding to a third function corresponding to the second user input on an area other than the first portion of the second portion. According to various embodiments, the second screen 1041 and the third screen 1042 may have the same size or different sizes. According to various embodiments, the ratio of the split screen is not limited thereto.

According to various embodiments, the ratio of the split screen may be determined by user configuration in a process of mapping the second user input to the function. For another example, the ratio of the split screen may be changed by a user operation (e.g., long press and drag the border of the split area) in a state in which the split screen is displayed as shown in FIG. 10D.

According to various embodiments, referring to FIG. 10E, the electronic device may display two screens on which two functions corresponding to the second user input are performed, respectively, in a split screen on the exposed second portion of the flexible display.

For example, the electronic device may maintain a screen 1050 having been displayed before the start of a sliding operation in an area corresponding to the first portion of the exposed second portion of the flexible display, and display a first screen 1051 corresponding to a first function and a second screen 1052 corresponding to a second function corresponding to the second user input on the second portion excluding the first portion. According to various embodiments, the first screen 1051 and the second screen 1052 may have the same size or different sizes. The ratio of the split screen is not limited thereto.

According to various embodiments, the ratio of the split screen may be determined by user configuration in a process of mapping the second user input to the function. For another example, the ratio of the split screen may be changed by a user operation (e.g., to long press and drag the border of the split area) in a state in which the split screen is displayed as shown in FIG. 10E.

According to various embodiments, referring to FIG. 10F, the electronic device may display two screens on which two functions corresponding to the second user input are performed, respectively, as multiple pop-up screens on a part of the exposed second portion of the flexible display.

For example, the electronic device may maintain a screen having been displayed before the start of a sliding operation in the exposed second portion 1060 of the flexible display, display a first screen 1061 on which a first function corresponding to the second user input is performed on a first partial area of the second portion, and display a second screen 1062 on which a second function corresponding to the second user input is performed on a second partial area of the second portion in a pop-up form.

According to various embodiments, a size and form (e.g., a ratio of width and height of a pop-up screen) of at least one of the first screen 1061 or the second screen 1062 may be determined by user configuration in a process of mapping the second user input to the function. For another example, a size and form of at least one of the first screen 1061 or the second screen 1062 may be changed by a user operation (e.g., long press and drag the border of a pop-up screen) in a state in which the screens in a pop-up form are displayed as shown in FIG. 10F.

The display type of the at least one screen on which at least one function corresponding to the second user input is performed is not limited to FIG. 10A to FIG. 10F. According to various embodiments, among multiple screens on which multiple functions corresponding to the second user input are performed, respectively, the first screen may be displayed in full screen form and the second screen may be displayed in a pop-up screen form, or the first screen may be displayed in a split screen form and the second screen may be displayed in a pop-up screen form.

Figure 11:
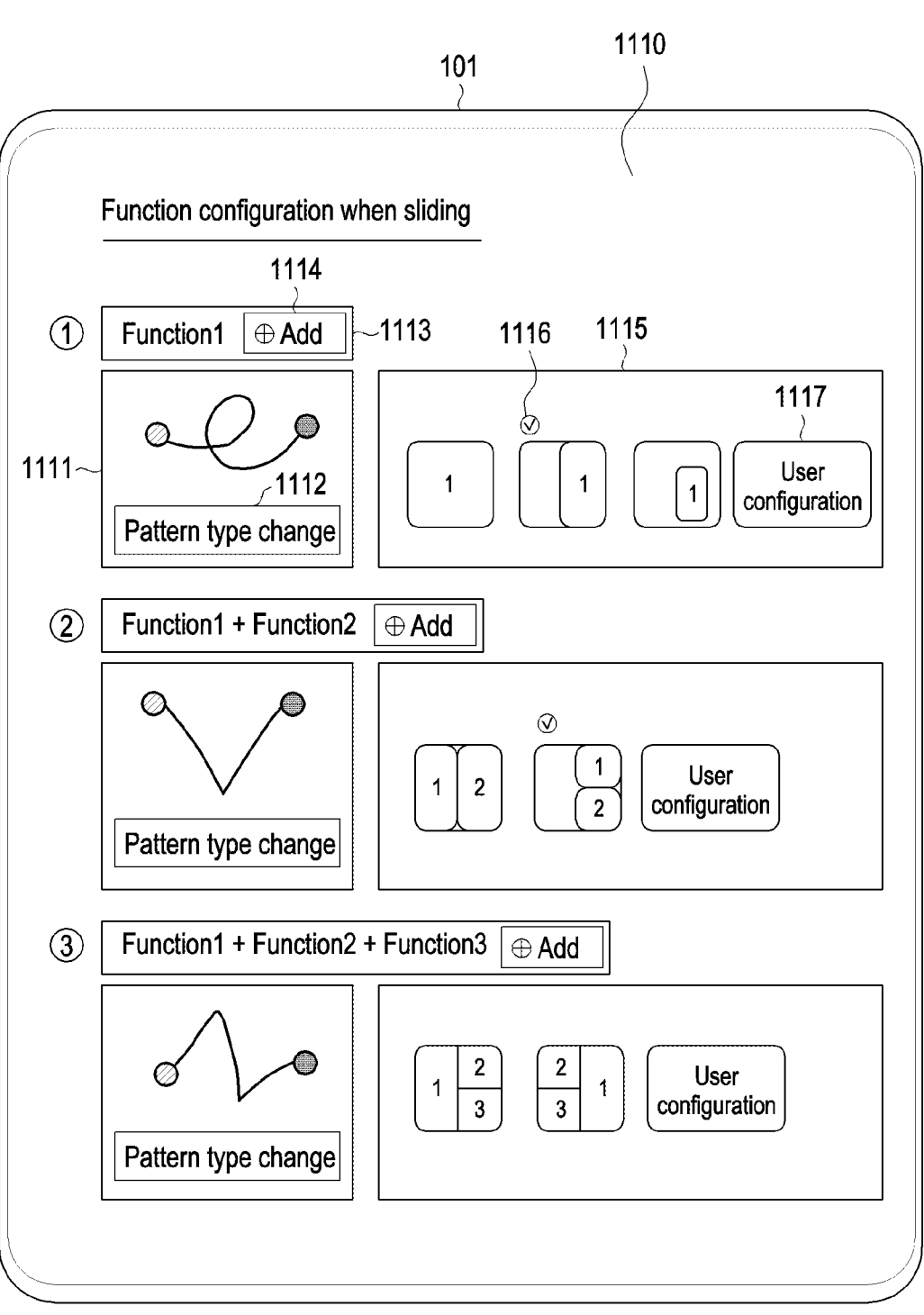
FIG. 11 is a diagram illustrating a user interface provided to a user to map at least one of a second user input, a function, or a display form of a screen on which a function is performed by user configuration according to various example embodiments.

FIG. 11 is a diagram illustrating a user interface provided to a user to map at least one of a second user input, a function, or a display type of a screen on which a function is performed by user configuration according to various embodiments.

According to various embodiments, referring to FIG. 11, the electronic device 101 (e.g., the electronic device 101 or the processor 120 in FIG. 1) may display a user interface 1110 for configuring a function to be performed according to a user input during a sliding operation of the flexible display.

For example, the user interface 1110 may include an area 1111 for configuring a second user input, an area 1113 for configuring a function corresponding to the second user input, and an area 1115 for configuring a display type of a screen on which the function is performed.

According to various embodiments, the electronic device 101 may receive a user input to be configured as the second user input through an area 1111 for configuring the second user input. According to various embodiments, the area 1111 for configuring the second user input may include a button 1112 for pattern type change. For example, in case that selection of the button 1112 for pattern type change is received, the electronic device 101 may display a list including selectable pattern types (e.g., a dot pattern, a pattern drawing, a handwriting, an icon selection, a specific location selection, a voice input, or a gesture input), and receive a pattern type selection from a user.

According to various embodiments, the electronic device 101 may display a function corresponding to the second user input through the area 1113 for configuring the function corresponding to the second user input. According to various embodiments, the area 1113 for configuring the function corresponding to the second user input may include a button 1114 for adding the function corresponding to the second user input. For example, the electronic device 101 may map multiple functions to the second user input based on a user input for selecting the button 1114 for adding a function (e.g., application execution, payment function execution, other user account execution, or other mode execution) corresponding to the second user input. According to various embodiments, the area 1113 for configuring a function corresponding to the second user input may include a button (not shown) for deleting a selected function.

According to various embodiments, electronic device 101 may include available multiple display types on an area 1115 for configuring a display type of a screen on which a function is performed. The multiple display types included in the area 1115 for configuring a display type may be default configuration configured when the electronic device 101 is manufactured or a display type that a user frequently used.

For example, in case that a user input for selecting one display type among the multiple display types included in the area 1115 for configuring a display type is received, the electronic device 101 may display an object 1116 for indicating a selected display type.

According to various embodiments, the area 1115 for configuring a display type may include a user configuration button 1117 for configuring a display type by a user input. For example, in case that the user configuration button 1117 is selected, the electronic device 101 may display a user interface through which a position or size of a split screen or a pop-up screen may be configured by a user input.

According to various embodiments, in case that a display type is not selected, the electronic device 101 may map the second user input and at least one function and store same.

Figure 12:
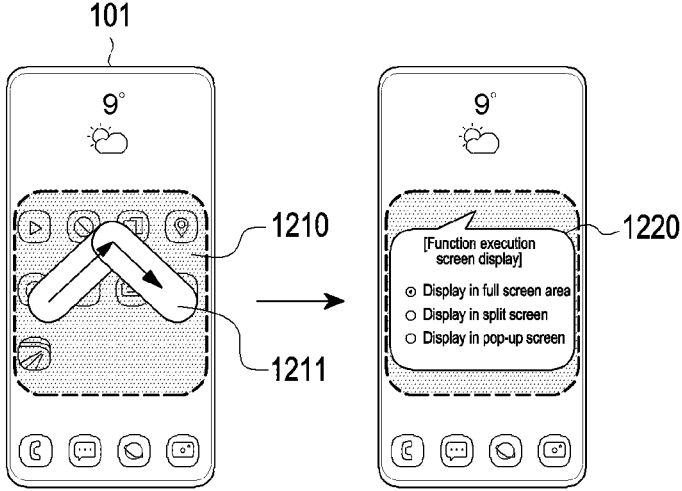
FIG. 12 is a diagram illustrating an operation of displaying a screen by an electronic device for selecting a display form of a screen on which a function is performed according to various example embodiments.

FIG. 12 is a diagram illustrating an operation of displaying a screen by an electronic device for selecting a display type of a screen on which a function is performed according to various embodiment.

According to various embodiments, referring to FIG. 12, in case that a first user input for a sliding operation of the flexible display is received, the electronic device 101 (e.g., the electronic device 101 or the processor 120 in FIG. 1) may display an object 1210 for receiving a user input for performing at least one function. According to various embodiments, in case that the second user input 1211 is received through an area on which an object 1210 for receiving a user input for performing at least one function is displayed, the electronic device 101 may identify a function corresponding to the second user input 1211 and a display type of a screen on which a function is performed.

According to various embodiments, in case that there is not display type of a function execution screen mapped to the second user input 1211, a screen 1220 for receiving a selection of a display type of the function execution screen may be displayed.

For example, a user may select whether to display the function execution screen in full screen, split screen, or pop-up screen through the screen 1220 for receiving a selection of a display type of the function execution screen.

According to various embodiments, the electronic device 101 may display a screen on which at least one function corresponding to the second user input 1211 is performed in a selected display type of the function execution screen.

Figure 13:
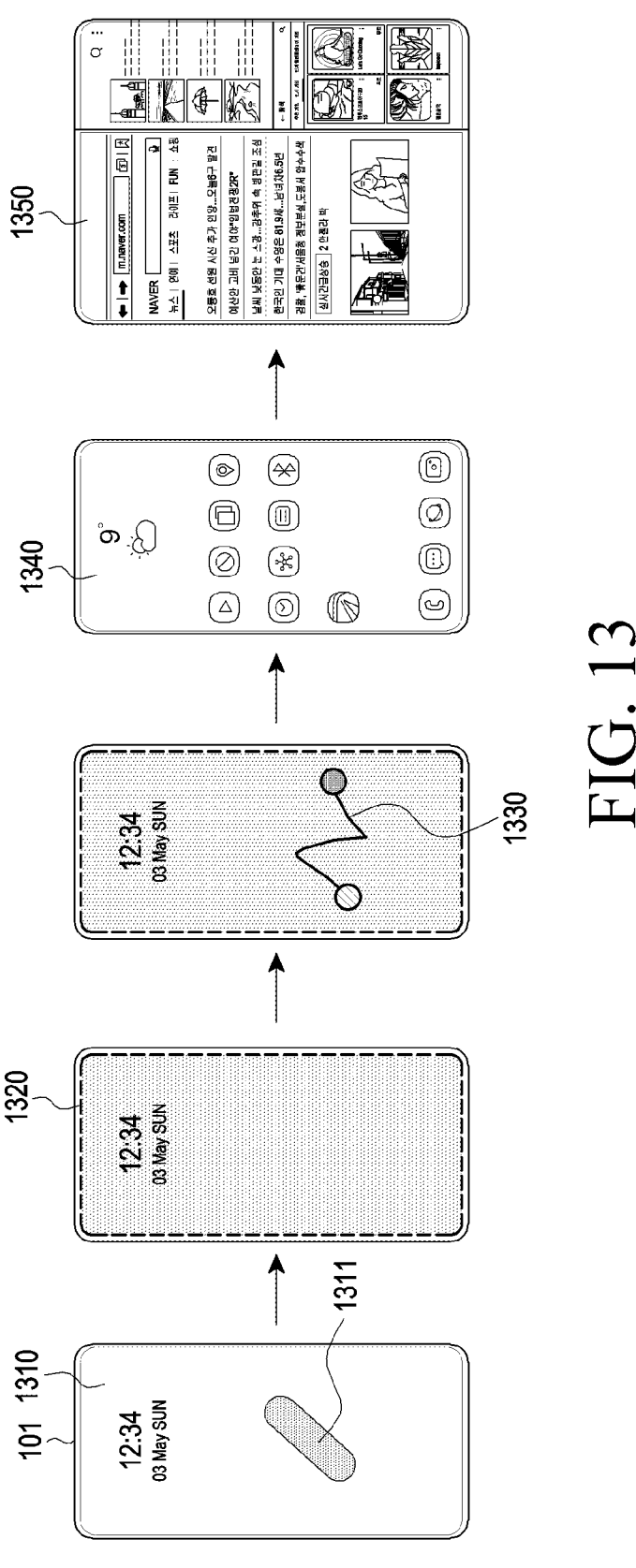
FIG. 13 is a diagram illustrating an operation of displaying a screen on which a function corresponding to a user input is performed, by an electronic device according to various example embodiments.

FIG. 13 is a diagram illustrating an operation of displaying a screen on which a function corresponding to a user input is performed, by an electronic device according to various embodiment.

According to various embodiments, referring to FIG. 13, the electronic device 101 (e.g., the electronic device 101 or the processor 120 in FIG. 1) may receive a first user input 1311 for a sliding operation of the flexible display through a lock screen 1310.

According to various embodiments, in case that the first user input 1311 is received, the electronic device 101 may display an object 1320 for receiving a user input for performing at least one function.

According to various embodiments, in case that the second user input 1330 is received through an area on which the object 1320 for receiving a user input for performing at least one function is displayed, the electronic device 101 may display a home screen 1340 obtained by unlocking the lock screen 1310 and display a screen 1350 on which at least one function corresponding to the second user input 1330 is performed.

According to various embodiments, the electronic device 101 may perform user recognition after the first user input 1311 is received and unlock the lock screen 1310 based on a user recognition result. According to various embodiments, an input operation for user recognition may be the second user input 1330 or an input operation separate from the second user input 1330.

Figure 14A:
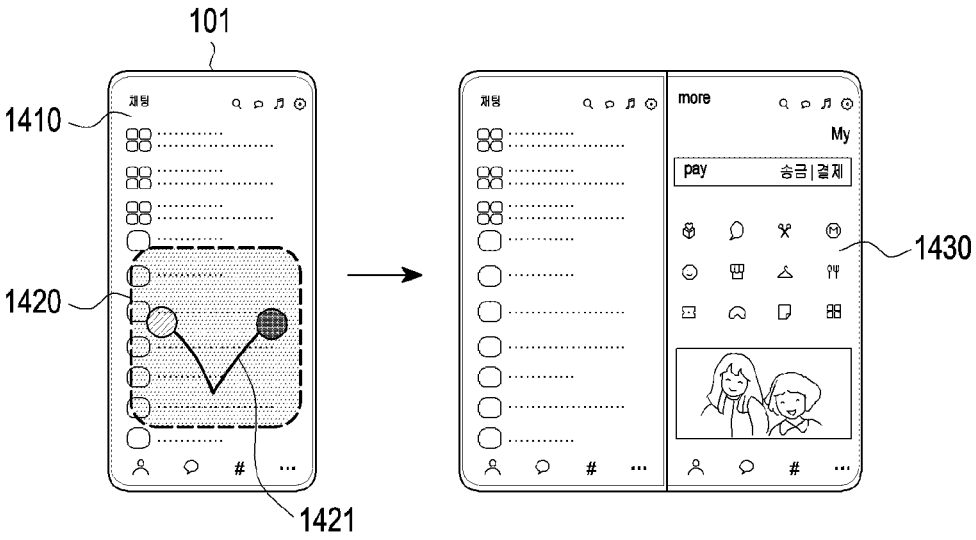
FIG. 14A is a diagram illustrating an operation of displaying a screen on which a function corresponding to a user input is performed, by an electronic device according to various example embodiments.
Figure 14B:
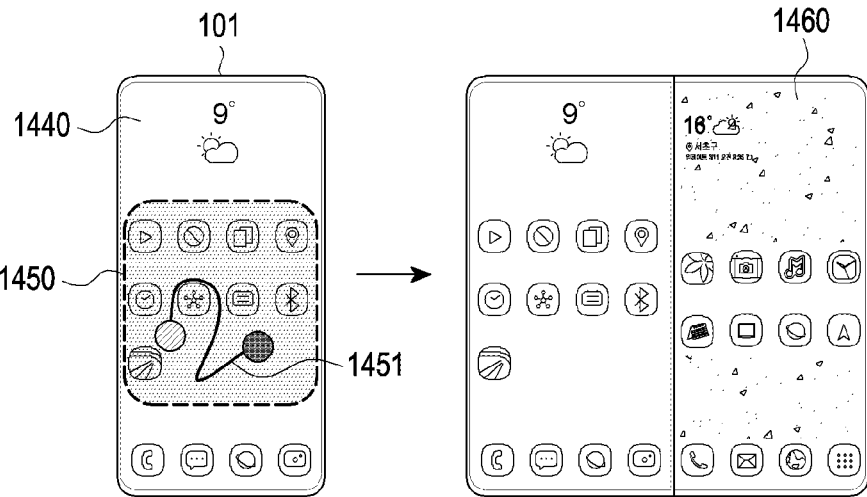
FIG. 14B is a diagram illustrating an operation of displaying a screen on which a function corresponding to a user input is performed, by an electronic device according to various example embodiments.

FIG. 14A is a diagram illustrating an operation of displaying a screen on which a function corresponding to a user input is performed, by an electronic device according to various embodiment. FIG. 14B is a diagram illustrating an operation of displaying a screen on which a function corresponding to a user input is performed, by an electronic device according to various embodiment. For example, FIG. 14A illustrates, as a function corresponding to a user input, an embodiment in which execution of an application of a second account among applications having a dual account is configured, and FIG. 14B illustrates, as a function corresponding to a user input, an embodiment in which execution of a communication service based on a second telephone number of an electronic device having two telephone numbers is configured.

According to various embodiments, referring to FIG. 14A, the electronic device 101 may display an execution screen 1410 of an application executed under a first account through an exposed first portion of a flexible display (e.g., the display module 160 in FIG. 1). According to various embodiments, in case that a first user input for a sliding operation of the flexible display is received through the execution screen 1410 of the application executed under the first account, the electronic device 101 may display an object 1420 for receiving a user input for performing at least one function.

According to various embodiments, in case that the second user input 1421 is received through an area on which the object 1420 for receiving a user input for performing at least one function is displayed, the electronic device 101 may identify at least one function corresponding to the second user input 1421.

According to various embodiments, in case that the function corresponding to the second user input 1421 is to execute an application under a second user account, the electronic device 101 may display an application screen 1430 executed under the second user account on at least a part of the exposed second portion of the flexible display.

In FIG. 14A, although, it is described that the application screen 1430 executed under the second user account is displayed in a split screen on a part of the exposed second portion of the flexible display, the screen may be displayed in a pop-up screen in a part of the second portion or in full screen on the second portion according to various embodiments.

According to various embodiments, referring to FIG. 14B, the electronic device 101 may display a screen 1440 on which a communication service based on a first telephone number is performed, through an exposed first portion of a flexible display (e.g., the display module 160 in FIG. 1). According to various embodiments, in case that a first user input for a sliding operation of the flexible display is received through the screen 1440 on which the communication service based on the first telephone number is executed, the electronic device 101 may display an object 1450 for receiving a user input for performing at least one function.

According to various embodiments, in case that the second user input 1451 is received through an area on which the object 1450 for receiving a user input for performing at least one function is displayed, the electronic device 101 may identify at least one function corresponding to the second user input 1451.

According to various embodiments, in case that the function corresponding to the second user input 1451 is to execute a communication service based on a second telephone number, the electronic device 101 may display a screen 1460 on which the communication service based on the second telephone number is executed, on at least a part of the exposed second portion of the flexible display.

In FIG. 14B, although, it is described that the screen 1460 on which the communication service based on the second telephone number is executed is displayed in a split screen on at least a part of the exposed second portion of the flexible display, the screen may be displayed in a pop-up screen in a part of the second portion or in full screen on the second portion according to various embodiments.

According to various embodiments, the electronic device 101 may perform user recognition after the first user input is received, release security of the second account or the second telephone number based on a user recognition result, and execute an application under the second account or a communication service based on the second telephone number. According to various embodiments, an input operation for user recognition may be the second user input 1421 or 1451 or an input operation separate from the second user input 1421 or 1451.

Figure 15A:
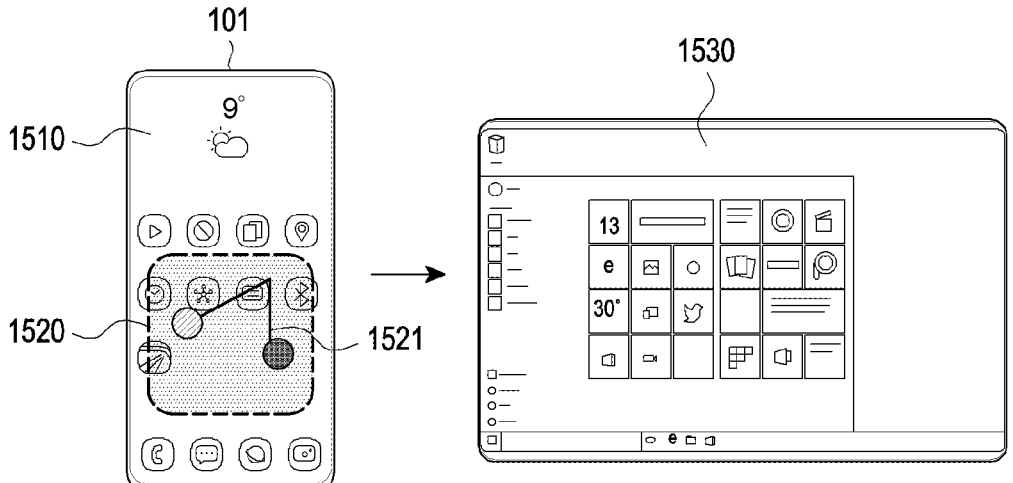
FIG. 15A is a diagram illustrating an operation of displaying a screen on which a function corresponding to a user input is performed, by an electronic device according to various example embodiments.
Figure 15B:
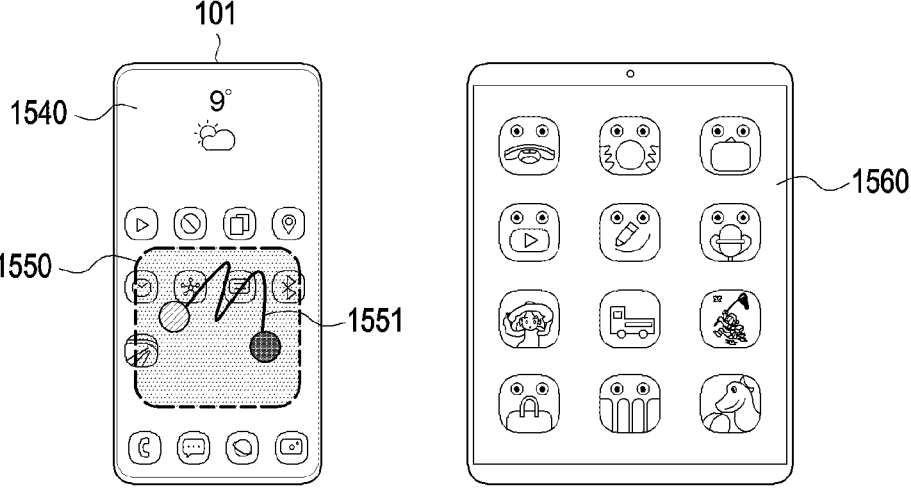
FIG. 15B is a diagram illustrating an operation of displaying a screen on which a function corresponding to a user input is performed, by an electronic device according to various example embodiments.

FIG. 15A is a diagram illustrating an operation of displaying a screen on which a function corresponding to a user input is performed, by an electronic device according to various embodiment. FIG. 15B is a diagram illustrating an operation of displaying a screen on which a function corresponding to a user input is performed, by an electronic device according to various embodiment. For example, FIG. 15A illustrates, as a function corresponding to a user input, an embodiment in which tablet PC mode execution is configured, and FIG. 15B illustrates, as a function corresponding to a user input, an embodiment in which kid mode execution is configured.

According to various embodiments, referring to FIG. 15A, the electronic device 101 may display a screen 1510 on which a smartphone mode is executed, through an exposed first portion of a flexible display (e.g., the display module 160 in FIG. 1). According to various embodiments, in case that a first user input for a sliding operation of the flexible display is received through the screen 1510 on which the smartphone mode is executed, the electronic device 101 may display an object 1520 for receiving a user input for performing at least one function.

According to various embodiments, in case that the second user input 1521 is received through an area on which the object 1520 for receiving a user input for performing at least one function is displayed, the electronic device 101 may identify at least one function corresponding to the second user input 1521.

According to various embodiments, in case that the function corresponding to the second user input 1521 is to execute a tablet PC mode, the electronic device 101 may display a screen 1530 on which the tablet PC mode is executed, in full screen on the exposed second portion of the flexible display.

For example, the screen 1530 on which the tablet PC mode is executed may correspond to arranging information (e.g., weather information, time information, and the like) or an icon of at least one application displayed on the screen 1510 on which the smartphone mode is executed so as to fit a size of the exposed second portion of the flexible display. For example, icons of at least one application displayed on the screen 1530 on which the tablet PC mode is executed and the screen 1510 on which the smartphone mode is executed may be sequentially arranged from a left upper end of the exposed second portion of the flexible display, and weather information may be sequentially arranged from a right lower end of the exposed second portion of the flexible display.

According to various embodiments, referring to FIG. 15B, the electronic device 101 may display a screen 1540 on which a smartphone mode is executed, through an exposed first portion of a flexible display (e.g., the display module 160 in FIG. 1). According to various embodiments, in case that a first user input for a sliding operation of the flexible display is received through the screen 1540 on which the smartphone mode is executed, the electronic device 101 may display an object 1550 for receiving a user input for performing at least one function.

According to various embodiments, in case that the second user input 1551 is received through an area on which the object 1550 for receiving a user input for performing at least one function is displayed, the electronic device 101 may identify at least one function corresponding to the second user input 1551.

According to various embodiments, in case that the function corresponding to the second user input 1551 is to execute a kid mode, the electronic device 101 may display a screen 1560 on which the kid mode is executed, in full screen on the exposed second portion of the flexible display.

In FIG. 15A and FIG. 15B, although, it is described that the screen 1530 or 1560 obtained by executing different modes is displayed in full screen on the exposed second portion of the flexible display, the screen may be displayed in a split screen or pop-up screen on a part of the second portion according to various embodiments.

According to various embodiments, the electronic device 101 may perform user recognition after the first user input is received, release security for mode execution based on a user recognition result, and change a mode. According to various embodiments, an input operation for user recognition may be the second user input 1521 or 1551 or an input operation separate from the second user input 1521 or 1551.

Figure 16A:
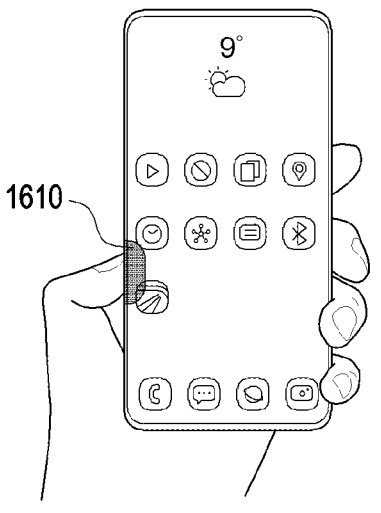
FIG. 16A is a diagram illustrating a user recognition operation of an electronic device according to various example embodiments.

FIG. 16A is a diagram illustrating a user recognition operation of an electronic device according to various embodiments.

According to various embodiments, referring to FIG. 16A, the electronic device 101 (e.g., the electronic device 101 or the processor 120 in FIG. 1) may detect a fingerprint of a user based on a first user input 1610 for a sliding operation of a flexible display (e.g., the display module 160 in FIG. 1). For example, in case that the first user input 1610 is a long-press touch (or touch and drag, pressure touch), the electronic device 101 may recognize a fingerprint detected during reception of a long-press touch and perform user recognition. According to various embodiments, in case that only a user account and a function are mapped and stored, the electronic device 101 may determine that a fingerprint detected during reception of the first user input 1610 is received as a second user input, and display a screen on which a function corresponding to a recognition result of the detected fingerprint is performed, on at least a part of the exposed second portion of the flexible display.

Figure 16B:
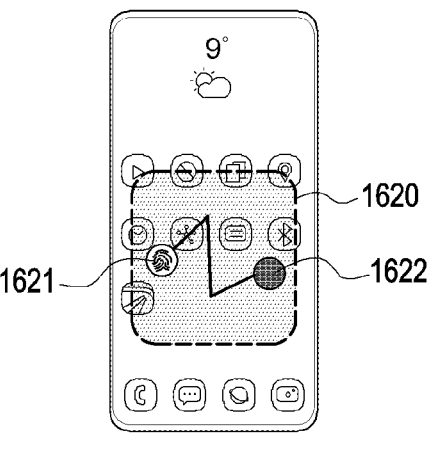
FIG. 16B is a diagram illustrating a user recognition operation of an electronic device according to various example embodiments.

FIG. 16B is a diagram illustrating a user recognition operation of an electronic device according to various embodiments.

According to various embodiments, referring to FIG. 16B, in case that a first user for a sliding operation of the flexible display is received, the electronic device 101 may display an object 1620 for receiving a user input for performing at least one function and detect a fingerprint of a user based on a second user input received through an area on which the object 1620 is displayed. For example, in case that the second user input is a dot pattern input, pattern drawing, or a handwriting input performed by a fingerprint of a user, the electronic device 101 may recognize a fingerprint detected on a touch start point 1621 or a touch end point 1622, and perform user recognition.

According to various embodiments, the second user input may a touch input for fingerprint recognition not a pattern input. For example, in case that the second user input is a touch input for fingerprint recognition, the electronic device 101 may display a screen on which a function corresponding to a fingerprint recognition result is performed, on at least a part of the exposed second portion of the flexible display. For another example, in case that the second user input is a pattern input other than a touch input for fingerprint recognition, the electronic device 101 may display a screen on which a function corresponding to the second user input and a fingerprint recognition result is performed, on at least a part of the exposed second portion of the flexible display.

Figure 16C:
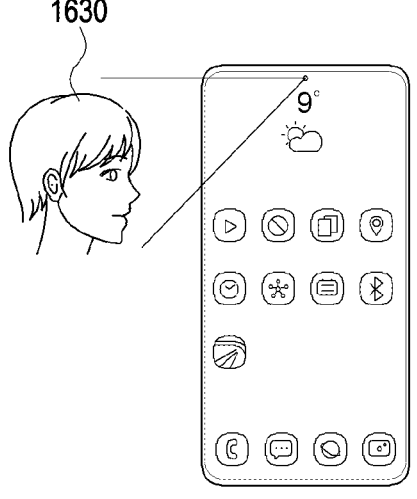
FIG. 16C is a diagram illustrating a user recognition operation of an electronic device according to various example embodiments.

FIG. 16C is a diagram illustrating a user recognition operation of an electronic device according to various embodiments.

According to various embodiments, referring to FIG. 16C, the electronic device 101 may perform user recognition through recognition of a user face 1630. For example, in case that the second user input is a user face 1630 input for face recognition, the electronic device 101 may display a screen on which a function corresponding to a user face 1630 recognition result is performed, on at least a part of the exposed second portion of the flexible display. For another example, in case that the second user input is an input separate from a user face 1630 input for face recognition, the electronic device 101 may display a screen on which a function corresponding to the second user input and a user face 1630 recognition result is performed, on at least a part of the exposed second portion of the flexible display.

Figure 16D:
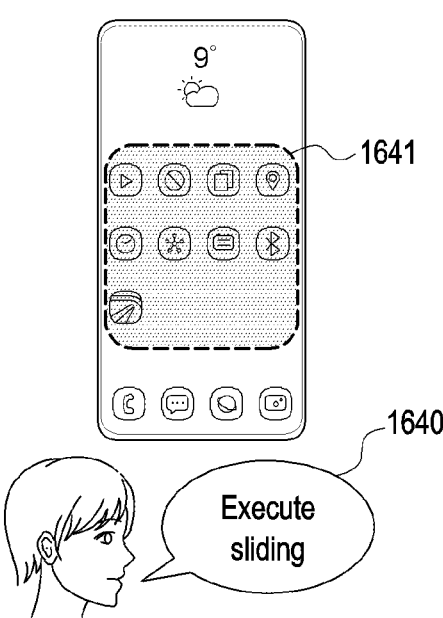
FIG. 16D is a diagram illustrating a user recognition operation of an electronic device according to various example embodiments.

FIG. 16D is a diagram illustrating a user recognition operation of an electronic device according to various embodiments.

According to various embodiments, referring to FIG. 16D, the electronic device 101 may perform user recognition based on a user voice 1640. For example, in case that a first user input is a user voice 1640 input (e.g., Execute sliding), the electronic device 101 may display an object 1641 for receiving a user input for performing at least one function and perform user recognition based the input user voice 1640. According to various embodiments, the electronic device 101 may display a screen on which a function corresponding to the second user input input through the object 1641 for receiving a user input and a user recognition result performed by the user voice 1640 is performed, on at least a part of the exposed second portion of the flexible display.

According to various embodiments, in case that the user voice 1640 input as the first user input includes a voice related to a function (e.g., Execute sliding and execute the security folder), the electronic device 101 may release security of a function (e.g., a security folder) corresponding to a voice recognition result of the user voice 1640 and a user recognition result based on the user voice 1640 and display a screen on which a function is performed, on at least a part of the exposed second portion of the flexible display.

For another example, in case that a first user input other than a voice input is received, the electronic device 101 may display an object 1641 for receiving a user input for performing at least one function. According to various embodiments, in a state in which the object 1641 for receiving a user input for performing at least one function is displayed, the electronic device 101 may receive a user voice 1640 (e.g., Execute the security folder) as the second user input. According to various embodiments, the electronic device 101 may release security of a function (e.g., a security folder) corresponding to a voice recognition result and a user recognition result based on the user voice 1640 and display a screen on which a function is performed, on at least a part of the exposed second portion of the flexible display.

According to various embodiments, the user voice 1640 input may be separate from the first user input for sliding of the flexible display and the second user input for performing a function. For example, the user voice input 1640 may be an input only for user recognition. According to various embodiments, the electronic device 101 may display a screen on which a function corresponding to the second user input input through the object 1641 for receiving a user input and a user recognition result based on the user voice 1640 is performed, on at least a part of the exposed second portion of the flexible display.

Figure 17:
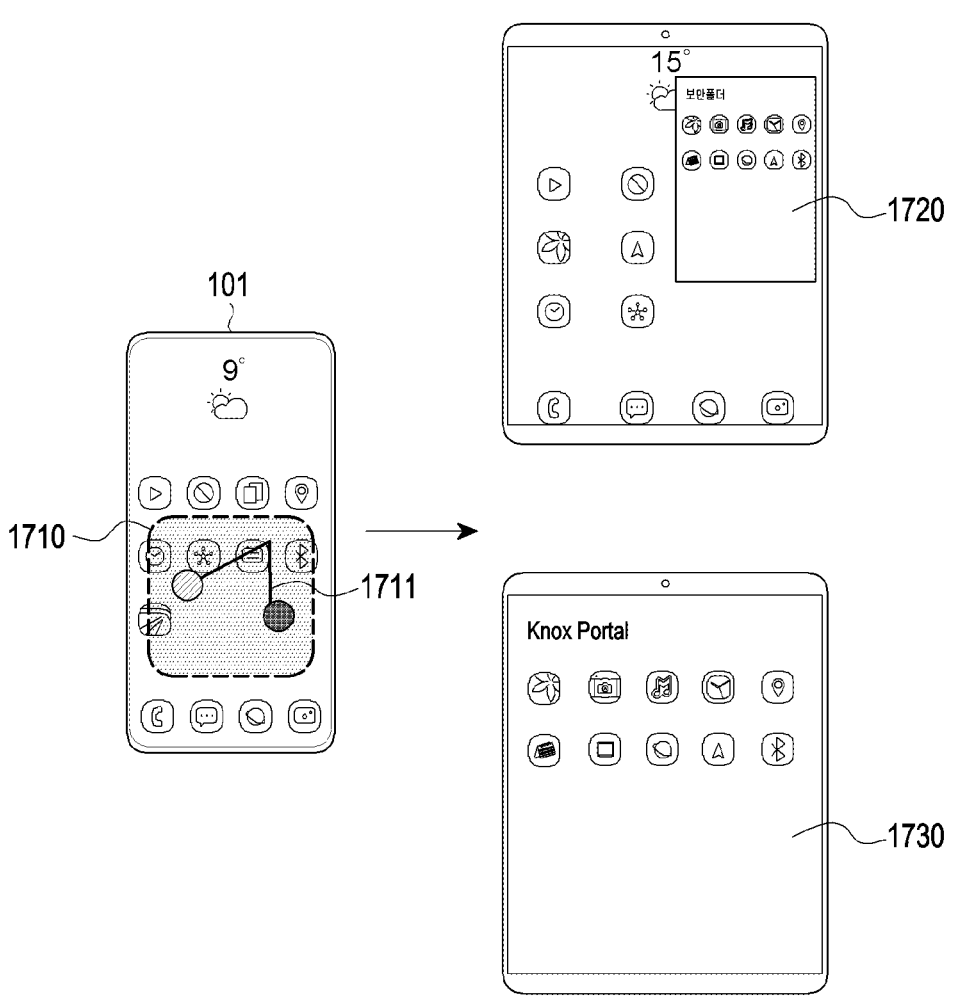
FIG. 17 is a diagram illustrating an operation of displaying a screen on which a function corresponding to a user recognition result is performed, by an electronic device according to various example embodiments.

FIG. 17 is a diagram illustrating an operation of displaying a screen on which a function corresponding to a user recognition result is performed, by an electronic device according to various embodiment.

According to various embodiments, referring to FIG. 17, in case that a first user input for a sliding operation of the flexible display is received, the electronic device 101 (e.g., the electronic device 101 or the processor 120 in FIG. 1) may display an object 1710 for receiving a user input for performing at least one function.

According to various embodiments, in case that a second user input 1711 is received through an area 1710 for receiving a user input for performing at least one function, the electronic device 101 may identify a function corresponding to the second user input 1711 and a display type of a screen on which a function is performed.

According to various embodiments, in case that the second user input 1711 corresponds to executing a security folder, as shown in FIG. 16A to 16D, the electronic device 101 may perform user recognition operation, release security of the security folder which is a function corresponding to the second user input 1711, based on a recognition result, and display a security folder execution screen in a pop-up screen 1720 on at least a part of the exposed second portion of the flexible display or in full screen 1730 on the second portion.

In FIG. 17, although, the second user input 1711 is described as a pattern input, but is not limited thereto, and the second user input 1711 may be an input for user recognition shown in FIG. 16A to FIG. 16D.

Figure 18:
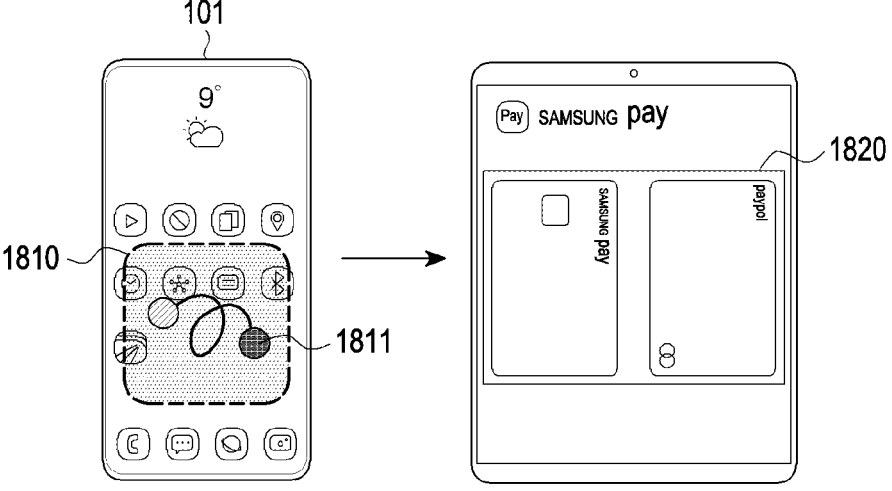
FIG. 18 is a diagram illustrating an operation of displaying a screen on which a function corresponding to a user recognition result is performed, by an electronic device according to various example embodiments.

FIG. 18 is a diagram illustrating an operation of displaying a screen on which a function corresponding to a user recognition result is performed, by an electronic device according to various embodiment.

According to various embodiments, referring to FIG. 18, in case that a first user input for a sliding operation of the flexible display is received, the electronic device 101 (e.g., the electronic device 101 or the processor 120 in FIG. 1) may display an object 1810 for receiving a user input for performing at least one function.

According to various embodiments, in case that the second user input 1811 is received through an area on which an object 1810 for receiving a user input for performing at least one function is displayed, the electronic device 101 may identify a function corresponding to the second user input 1811 and a display type of a screen on which a function is performed.

According to various embodiments, in case that the second user input 1811 corresponds to executing a payment function, as shown in FIG. 16A to 16D, the electronic device 101 may perform user recognition operation, release security of the payment function which is a function corresponding to the second user input 1811, based on a user recognition result, and display a payment function execution screen in full screen 1820 on the exposed second portion of the flexible display. According to various embodiments, the electronic device 101 may display an execution screen of the payment function which is a function corresponding to the second user input 1811, in a split screen or a pop-up screen on a part of the exposed second portion of the flexible display.

Figure 19:
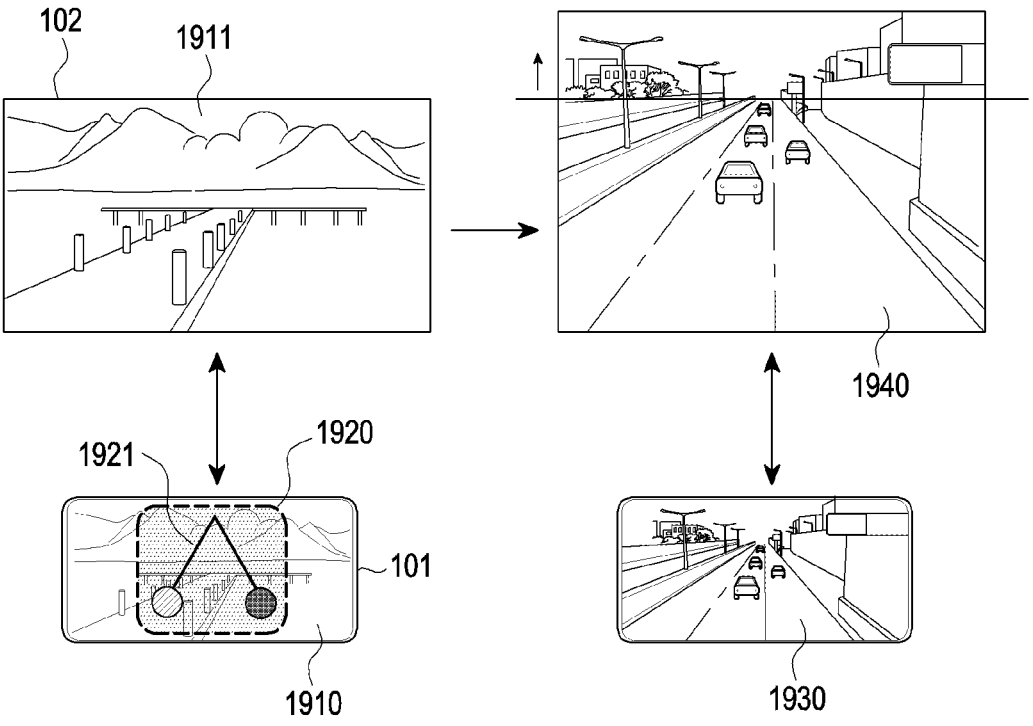
FIG. 19 is a diagram illustrating an operation of controlling a slidable external electronic device connected to an electronic device according to various example embodiments.

FIG. 19 is a diagram illustrating an operation of controlling a slidable external electronic device (e.g., a rollable TV) connected to an electronic device according to various embodiments.

According to various embodiments, referring to FIG. 19, the electronic device 101 (e.g., the electronic device 101 or the processor 120 in FIG. 1) may communicate (e.g., wiredly or wirelessly) with an external electronic device 102 (e.g., the electronic device 102 or the electronic device 104 in FIG. 1). For example, the electronic device 101 may be connected to perform a mirroring function with the external electronic device 102 and transmit information about a screen 1910 displayed on a flexible display (e.g., the display module 160 in FIG. 1) to the external electronic device 102. For example, the external electronic device 102 may display the same screen as the screen 1910 displayed on the electronic device 101 in full screen 1911 on an exposed first portion of a flexible display of the external electronic device 102, based on information about the screen received from the electronic device 101.

According to various embodiments, in case that a first user input for a sliding operation of the flexible display of the external electronic device 102 is received, the electronic device 101 may display an object 1920 for receiving a user input for performing at least one function.

According to various embodiments, in case that the second user input 1921 is received through an area on which an object 1920 for receiving a user input for performing at least one function is displayed, the electronic device 101 may display a screen 1930 on which a function corresponding to the second user input 1921 is performed, on the flexible display. According to various embodiments, the flexible display of the electronic device 101 may not perform a sliding operation.

According to various embodiments, the electronic device 101 may transmit information about the screen 1930 on which the function corresponding to the second user input 1921 is performed and a control command for a sliding operation of the flexible display of the external electronic device 102 to the external electronic device 102.

According to various embodiments, the external electronic device 102 may slide to expose a second portion of the flexible display of the external electronic device 102, based on the control command received from the electronic device 101. According to various embodiments, the external electronic device 102 may display the same screen as the screen 1930 in full screen 1940 on the exposed second portion of the flexible display of the external electronic device 102, based on information about the screen 1930, which is received from the electronic device 101.

In FIG. 19, it is described that the screen 1930 on which a function corresponding to the second user input 1921 is performed and the mirrored screen 1940 are displayed in full screen, but the screens may be displayed in a split screen or a pop-up screen according to user configuration shown in FIG. 11 or a user selection shown in FIG. 12.

Figure 20:
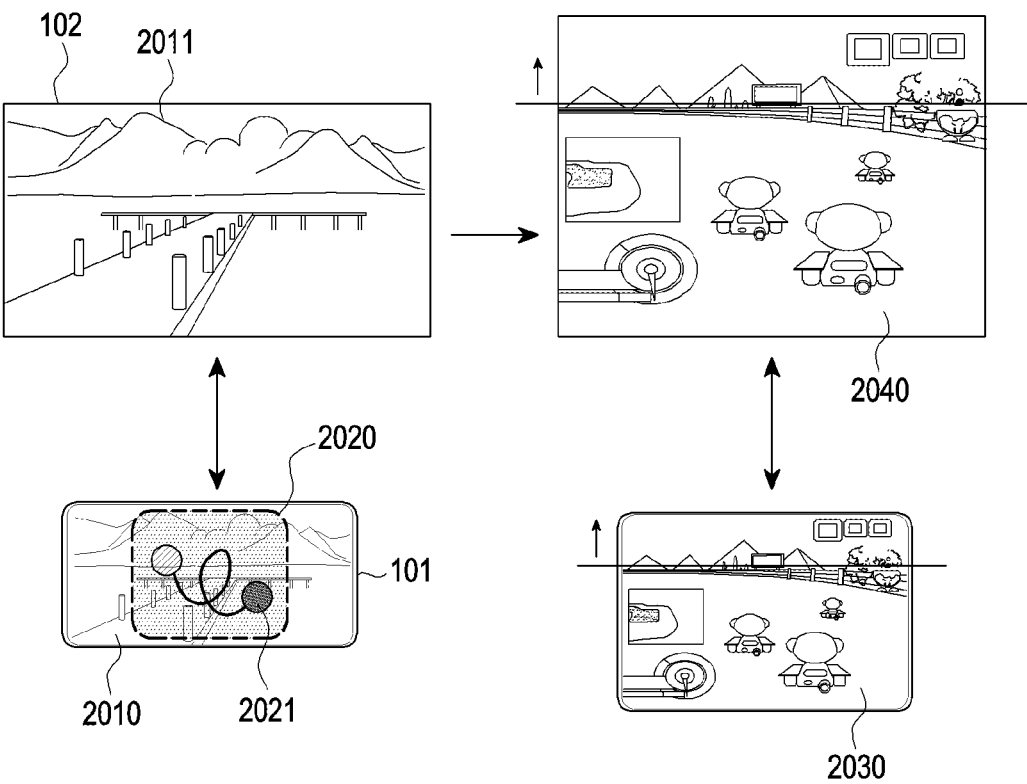
FIG. 20 is a diagram illustrating an operation of controlling a slidable external electronic device connected to an electronic device according to various example embodiments.

FIG. 20 is a diagram illustrating an operation of controlling a slidable external electronic device (e.g., a rollable TV) connected to an electronic device according to various embodiments.

According to various embodiments, referring to FIG. 20, the electronic device 101 (e.g., the electronic device 101 or the processor 120 in FIG. 1) may communicate (e.g., wiredly or wirelessly) with an external electronic device 102 (e.g., the electronic device 102 or the electronic device 104 in FIG. 1). For example, the electronic device 101 may be connected to perform a mirroring function with the external electronic device 102 and transmit information about a screen 2010 displayed on an exposed first portion of a flexible display (e.g., the display module 160 in FIG. 1) to the external electronic device 102. For example, the external electronic device 102 may display the same screen as the screen 2010 displayed on the electronic device 101 in full screen 2011 on an exposed third portion of a flexible display of the external electronic device 102, based on information about the screen received from the electronic device 101.

According to various embodiments, in case that a first user input for a sliding operation of the flexible display of the electronic device 101 is received, the electronic device 101 may display an object 2020 for receiving a user input for performing at least one function.

According to various embodiments, in case that a second user input 2021 is received through an area on which the object 2020 for receiving a user input for performing at least one function is displayed, the electronic device 101 may display a screen 2030 on which a function corresponding to the second user input 2021 is performed, on the second portion of the flexible display in which a sliding operation is performed.

According to various embodiments, the electronic device 101 may transmit information about the screen 2030 on which the function corresponding to the second user input 2021 is performed and a control command for a sliding operation of the flexible display of the external electronic device 102 to the external electronic device 102.

According to various embodiments, the external electronic device 102 may slide to expose a fourth portion of the flexible display of the external electronic device 102, based on the control command received from the electronic device 101. According to various embodiments, the external electronic device 102 may display the same screen as the screen 2030 in full screen 2040 on the exposed fourth portion of the flexible display of the external electronic device 102, based on information about the screen 2030, which is received from the electronic device 101.

In FIG. 20, it is described that the screen 2030 on which a function corresponding to the second user input 2021 is performed and the mirrored screen 2040 are displayed in full screen, but the screens may be displayed in a split screen or a pop-up screen according to user configuration shown in FIG. 11 or a user selection shown in FIG. 12.

Figure 21:
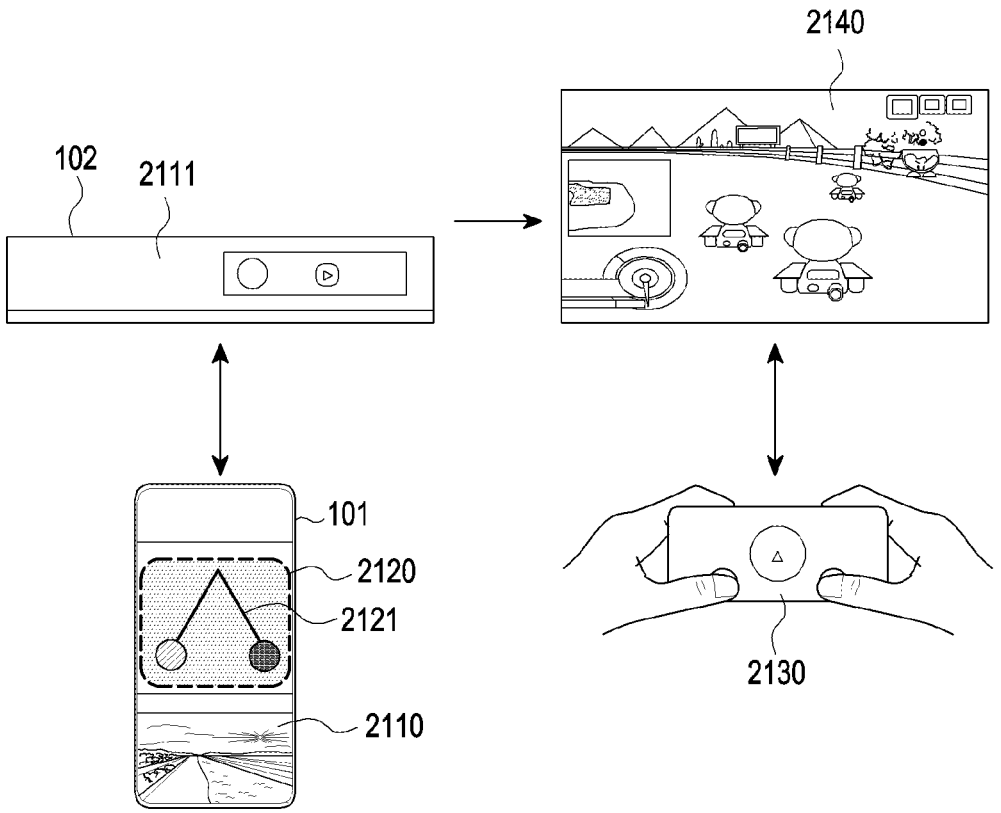
FIG. 21 is a diagram illustrating an operation of controlling a slidable external electronic device connected to an electronic device according to various example embodiments.

FIG. 21 is a diagram illustrating an operation of controlling a slidable external electronic device (e.g., a rollable TV) connected to an electronic device according to various embodiments.

According to various embodiments, referring to FIG. 21, the electronic device 101 (e.g., the electronic device 101 or the processor 120 in FIG. 1) may communicate (e.g., wiredly or wirelessly) with an external electronic device 102 (e.g., the electronic device 102 or the electronic device 104 in FIG. 1). For example, the electronic device 101 may be connected to the external electronic device 102 to allow connection (e.g., Samsung DeX™ function) and perform a function as a desktop PC, and in case that the external electronic device 102 is used as an external monitor, the electronic device 101 may operate as an input device of the external electronic device 102.

According to various embodiments, the electronic device 101 may display a first application execution screen 2110 (e.g., an SNS application execution screen) through a flexible display (e.g., the display module 160 in FIG. 1) and display a second application execution screen 2111 (e.g., a music reproduction application) through an exposed first portion of the flexible display of the external electronic device 102. According to various embodiments, the electronic device 101 may not display an application execution screen through the flexible display.

According to various embodiments, in case that a first user input for a sliding operation of the flexible display of the external electronic device 102 is received, the electronic device 101 may display an object 2120 for receiving a user input for performing at least one function.

According to various embodiments, in case that the electronic device 101 receives a second user input 2121 through an area on which the object 2120 for receiving a user input for performing at least one function is displayed, the electronic device 101 may transmit information about a screen on which a function corresponding to the second user input 2121 is performed and a control command for a sliding operation of the flexible display of the external electronic device 102 to the external electronic device 102.

According to various embodiments, the flexible display of the electronic device 101 may be used as a touch pad for controlling a screen displayed on the external electronic device 102.

For example, in case that a function corresponding to the second user input 2121 is to execute a game, the electronic device 101 may transmit information about a game execution screen and a control command for a sliding operation of the flexible display of the external electronic device 102 to the external electronic device 102. For example, the electronic device 101 may display a game operation pad screen 2130 for controlling the game execution screen on the flexible display of the electronic device 101. According to various embodiments, the flexible display of the electronic device 101 may not perform a sliding operation.

According to various embodiments, the external electronic device 102 may slide to expose a second portion of the flexible display of the external electronic device 102, based on the control command received from the electronic device 101. According to various embodiments, the external electronic device 102 may display a screen on which a function is performed in full screen 2140 on the exposed second portion of the flexible display of the external electronic device 102, based on information about the screen, which is received from the electronic device 101.

In FIG. 21, it is described that the screen 2140 on which a function corresponding to the second user input 2121 is performed is displayed in full screen, but the screen may be displayed in a split screen or a pop-up screen according to user configuration shown in FIG. 11 or a user selection shown in FIG. 12.

According to various embodiments, an electronic device may include a housing, a flexible display at least a part of which is exposed to the outside through the housing, and at least one processor operatively connected, directly or indirectly, to the flexible display, wherein the at least one processor is configured to, in a state where a first portion of the flexible display is exposed to the outside, when a first user input for a sliding operation for exposing a second portion including at least a part of the first portion of the flexible display to the outside is received through the flexible display, display, on the at least a part of the first portion, an object for receiving a user input for performing at least one function, receive a second user input through a region in which the object is displayed, when the second user input is received, slide at least one region of the flexible display to expose the second portion of the flexible display to the outside, and display, on at least a part of the second portion, at least one screen on which at least one function corresponding to the second user input is performed.

According to various embodiments, the at least one processor may display at least one application execution screen corresponding to the second user input in a split screen of at least a part of the second portion, in a pop-up screen, or in full screen of the second portion.

According to various embodiments, the second portion may include the first portion and an extended additional area configured by an extension sliding of the flexible display, and the at least one processor may display the at least one application execution screen on the additionally extended area.

According to various embodiments, a memory may be further included, and the at least one application and a display type of the at least one application execution screen for may be matched to the second user input by user configuration and stored in the memory.

According to various embodiments, the at least one processor may display, in case that the second user input is received, a screen for selecting a display type of at least one application execution screen corresponding to the second user input, and, in case that a third user input for selecting the display type is received, display the at least one application execution screen in a split screen of at least a part of the second portion, in a pop-up screen, or in full screen of the second portion, based on the third user input.

According to various embodiments, the at least one processor may display a screen on which a function related to a user account corresponding to the second user input is performed in a split screen of at least a part of the second portion, in a pop-up screen, or in full screen of the second portion.

According to various embodiments, the at least one processor may perform user recognition and display at least one screen on which at least one function corresponding to the second user input and the user recognition result is performed, on at least a part of the second portion.

According to various embodiments, in case that the at least one function is a secure function, the at least one processor may release security of the at least one function based on a user account corresponding to the user recognition result and display at least one screen on which the at least one function is performed, on at least a part of the second portion.

According to various embodiments, the at least one processor may perform user recognition through a fingerprint detected while the first user input or the second user input is received, in case that the at least one function is a secure function, release security of the at least one function based on a user account corresponding to the second user input and the fingerprint recognition result, and display at least one screen on which the at least one function is performed, on at least a part of the second portion.

According to various embodiments, the second user input may include a user input for user recognition, and the at least one processor may perform user recognition based on the second user input and display at least one screen on which at least one function corresponding to the user recognition result is performed, on at least a part of the second portion.

According to various embodiments, the second user input may include a touch input on one area among multiple areas included in the object displayed according to the first user input, and the at least one processor may display at least one screen on which a function corresponding to a position of the touch input is performed, on at least a part of the second portion.

According to various embodiments, a communication module (comprising communication circuitry) may be further included, and the at least one processor may transmit, through the communication module, a command for a sliding operation of a display included in an external electronic device and information related to at least one screen to the external electronic device so that the at least one screen on which at least one function corresponding to the second user input is performed is displayed on the display included in the external electronic device.

According to various embodiments, a control method of an electronic device may include in a state where a first portion of a flexible display is exposed to the outside, in case that a first user input for a sliding operation for exposing a second portion including at least a part of the first portion of the flexible display to the outside is received through the flexible display, an operation of displaying, on the at least a part of the first portion, an object for receiving a user input for performing at least one function, an operation of receiving a second user input through a region in which the object is displayed, in case that the second user input is received, an operation of sliding at least one region of the flexible display to expose the second portion of the flexible display to the outside, and an operation of displaying, on at least a part of the second portion, at least one screen on which at least one function corresponding to the second user input is performed.

According to various embodiments, in the operation of displaying on at least a part of the second portion, at least one application execution screen corresponding to the second user input may be displayed in a split screen on at least a part of the second portion, in a pop-up screen, or in full screen on the second portion.

According to various embodiments, the second portion may include the second portion includes the first portion and an extended additional area configured by an extension sliding of the flexible display, and in the operation of displaying on at least a part of the second portion, the at least one application execution screen may be displayed on the additionally extended area.

According to various embodiments, an operation of displaying, in case that the second user input is received, a screen for selecting a display type of at least one application execution screen corresponding to the second user input may be further included, and, in the operation of displaying on at least a part of the second portion, in case that a third user input for selecting the display type is received, the at least one application execution screen may be displayed in a split screen of at least a part of the second portion, in a pop-up screen, or in full screen of the second portion.

According to various embodiments, an operation of performing user recognition may be further included and in the operation of displaying on at least a part of the second portion, at least one screen on which at least one function corresponding to the second user input and the user recognition result is performed may be displayed on at least a part of the second portion.

According to various embodiments, in the operation of displaying on at least a part of the second portion, in case that the at least one function is a secure function, security of the at least one function may be released based on a user account corresponding to the user recognition result and at least one screen on which at least one function is performed may be displayed on at least a part of the second portion.

According to various embodiments, in the operation of performing user recognition, user recognition may be performed through a fingerprint detected while the first user input or the second user input is received, and in the operation of displaying on at least a part of the second portion, in case that the at least one function is a secure function, security of the function may be released based on a user account corresponding to the second user input and the fingerprint recognition result, and at least one screen on which the at least one function is performed may be displayed on at least a part of the second portion.

According to various embodiments, the second user input may include a user input for user recognition, and in the operation of displaying on at least a part of the second portion, at least one screen on which at least one function corresponding the user recognition result based on the second user input is performed may be displayed on at least a part of the second portion.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various Certain example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various Certain example embodiments, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120, comprising processing circuitry) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various Certain example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a housing;
a flexible display at least a part of which is viewable to the outside; and
at least one processor operatively connected to the flexible display, wherein the at least one processor is configured to:
in a state where a first portion of the flexible display is viewable to the outside, based on a first user input for a sliding operation for exposing to be viewable a second portion of the flexible display comprising at least a part of the first portion of the flexible display being received via the flexible display, display, on the at least a part of the first portion, an object for receiving a user input for performing at least one function, wherein the object is displayed to overlap content displayed in the first portion and a function related to the overlapped content is deactivated,
receive a second user input via an area in which the object is displayed,
based on the second user input being received, slide at least one area of the flexible display to expose to be viewable the second portion of the flexible display, and display, on at least a part of the second portion, at least one screen on which at least one function corresponding to the second user input is to be performed.

2. The electronic device of claim 1, wherein the at least one processor is configured to display at least one application execution screen corresponding to the second user input in a split screen of at least a part of the second portion, in a pop-up screen, or in full screen of the second portion.

3. The electronic device of claim 2, wherein the second portion comprises the first portion and an additionally extended area configured by an extension sliding of the flexible display, and
the at least one processor is configured to display the at least one application execution screen on the additionally extended area.

4. The electronic device of claim 2, further comprising a memory,
wherein the at least one application and a display type of the at least one application execution screen are to be matched to the second user input by user configuration and stored in the memory.

5. The electronic device of claim 2, wherein the at least one processor is configured to,
based on the second user input being received, display a screen for selecting a display type of at least one application execution screen corresponding to the second user input, and
based on a third user input for selecting the display type being received, display the at least one application execution screen in a split screen of at least a part of the second portion, in a pop-up screen, or in full screen of the second portion, based on the third user input.

6. The electronic device of claim 1, wherein the at least one processor is configured to display a screen on which a function related to a user account corresponding to the second user input is to be performed in a split screen of at least a part of the second portion, in a pop-up screen, or in full screen of the second portion.

7. The electronic device of claim 1, wherein the at least one processor is configured to:
perform user recognition, and
display, on at least a part of the second portion, at least one screen on which at least one function corresponding to the second user input and a user recognition result is to be performed.

8. The electronic device of claim 7, wherein the at least one processor is configured to,
based on the at least one function being a secure function, release security of the function based on a user account corresponding to the user recognition result, and
display, on at least a part of the second portion, at least one screen on which the at least one function is to be performed.

9. The electronic device of claim 7, wherein the at least one processor is configured to:
perform user recognition through a fingerprint detected while the first user input and/or the second user input is received,
based on the at least one function being a secure function, release security of the function based on a user account corresponding to the second user input and a fingerprint recognition result, and
display, on at least a part of the second portion, at least one screen on which the at least one function is to be performed.

10. The electronic device of claim 1, wherein the second user input comprises a user input for user recognition, and the at least one processor is configured to:

perform user recognition based on the second user input, and display, on at least a part of the second portion, at least one screen on which at least one function corresponding to a user recognition result is to be performed.

11. The electronic device of claim 1, wherein the second user input comprises a touch input on an area among multiple areas included in the object displayed according to the first user input, and the at least one processor is configured to display, on at least a part of the second portion, at least one screen on which a function corresponding to a position of the touch input is to be performed.

12. An electronic device comprising:

a housing;

a flexible display at least a part of which is viewable to the outside;

at least one processor operatively connected to the flexible display; and a communication module comprising communication circuitry, wherein the at least one processor is configured to:

in a state where a first portion of the flexible display is viewable to the outside, based on a first user input for a sliding operation for exposing to be viewable a second portion of the flexible display comprising at least a part of the first portion of the flexible display being received via the flexible display, display, on the at least a part of the first portion, an object for receiving a user input for performing at least one function, receive a second user input via an area in which the object is displayed, based on the second user input being received, slide at least one area of the flexible display to expose to be viewable the second portion of the flexible display, display, on at least a part of the second portion, at least one screen on which at least one function corresponding to the second user input is to be performed, and transmit, through the communication module, a command for a sliding operation of a display included in an external electronic device and information related to at least one screen to the external electronic device so that the at least one screen on which at least one function corresponding to the second user input is to be performed can be displayed on the display included in the external electronic device.

13. A control method of an electronic device, the control method comprising:

in a state where a first portion of a flexible display is viewable to the outside, based on a first user input for a sliding operation for exposing to be viewable a second portion comprising at least a part of the first portion of the flexible display to the outside being received through the flexible display, displaying, on the at least a part of the first portion, an object for receiving a user input for performing at least one function, wherein the object is displayed to overlap content displayed in the first portion and a function related to the overlapped content is deactivated;

receiving a second user input through an area in which the object is displayed;

based on the second user input being received, sliding at least one area of the flexible display to expose the second portion of the flexible display to be viewable to the outside; and displaying, on at least a part of the second portion, at least one screen on which at least one function corresponding to the second user input is performed.

14. The control method of claim 13, wherein in the displaying on at least a part of the second portion, comprises displaying at least one application execution screen corresponding to the second user input in a split screen of at least a part of the second portion, in a pop-up screen, or in full screen of the second portion.

15. The control method of claim 14, wherein the second portion comprises the first portion and an additionally extended area configured by an extension sliding of the flexible display, and in the displaying on at least a part of the second portion, the at least one application execution screen is displayed on the additionally extended area.

16. The control method of claim 14, further comprising:

based on the second user input being received, displaying a screen for selecting a display type of at least one application execution screen corresponding to the second user input, and wherein in the displaying on at least a part of the second portion, comprises, based on a third user input for selecting the display type being received, displaying the at least one application execution screen in a split screen of at least a part of the second portion, in a pop-up screen, or in full screen of the second portion, based on the third user input.

17. The control method of claim 13, further comprising:

performing user recognition, and wherein in the displaying on at least a part of the second portion, comprises displaying on at least a part of the second portion, at least one screen on which at least one function corresponding to the second user input and a user recognition result is to be performed.

18. The control method of claim 17, wherein in the displaying on at least a part of the second portion, comprises, based on the at least one function being a secure function, releasing security of the function based on a user account corresponding to the user recognition result, and displaying, on at least a part of the second portion, at least one screen on which the at least one function is to be performed.

19. The control method of claim 17, wherein in the performing user recognition comprises, performing user recognition through a fingerprint detected while the first user input and/or the second user input is received, wherein in the displaying on at least a part of the second portion, comprises, based on the at least one function being a secure function, releasing security of the function based on a user account corresponding to the second user input and a fingerprint recognition result, and displaying on at least a part of the second portion, at least one screen on which the at least one function is to be performed.

20. The control method of claim 13, wherein the second user input comprises a user input for user recognition, and wherein in the displaying on at least a part of the second portion, comprises, performing user recognition based on the second user input, and displaying, on at least a part of the second portion, at least one screen on which at least one function corresponding to a user recognition result is to be performed.

* * * * *